United States Patent [19]
Itihara et al.

[11] Patent Number: 5,467,422
[45] Date of Patent: Nov. 14, 1995

[54] IMAGE FORMING APPARATUS WITH NEIGHBORING PIXEL PROCESSING

[75] Inventors: Yoshiyuki Itihara, Chohu; Satoshi Haneda, Hachioji; Noboru Koizumi, Hino; Takashi Hasebe; Tetsuya Niitsuma, both of Hachioji, all of Japan

[73] Assignee: Konica Corporation, Tokyo, Japan

[21] Appl. No.: 920,852

[22] Filed: Jul. 28, 1992

[30] Foreign Application Priority Data

Aug. 13, 1991 [JP] Japan ................... 3-202894
Mar. 12, 1992 [JP] Japan ................... 4-53714
May 25, 1992 [JP] Japan ................... 4-132590

[51] Int. Cl.$^6$ ................. H04N 1/40; H04N 1/405; G01D 15/14
[52] U.S. Cl. .............. 358/298; 358/443; 358/456; 347/129
[58] Field of Search .................... 358/298, 300, 358/443, 445, 448, 455–459, 462, 465, 466, 521, 530, 531, 532, 534, 535, 538, 540; 346/1.1, 108, 160; 395/109, 110, 128; 282/41, 54

[56] References Cited

U.S. PATENT DOCUMENTS

| | | | |
|---|---|---|---|
| 4,700,201 | 10/1987 | Sato | 346/108 |
| 4,782,398 | 11/1988 | Mita | 358/298 X |
| 4,800,442 | 1/1989 | Riseman et al. | 358/298 X |
| 4,868,684 | 9/1989 | Suzuki | 358/455 |
| 4,870,499 | 9/1989 | Suzuki et al. | 358/443 |
| 4,897,734 | 1/1990 | Sato et al. | 358/448 |
| 4,905,023 | 2/1990 | Suzuki | 346/108 |
| 4,926,268 | 5/1990 | Kawamura et al. | 358/458 |
| 4,969,053 | 11/1990 | Outa et al. | 358/458 |
| 5,050,000 | 9/1991 | Ng | 358/298 |
| 5,172,132 | 12/1992 | Haneda et al. | 346/1.1 |
| 5,251,267 | 10/1993 | Kawamura | 358/443 X |
| 5,265,196 | 11/1993 | Haneda | 395/109 |

FOREIGN PATENT DOCUMENTS

| | | | |
|---|---|---|---|
| 0212990A3 | 3/1987 | European Pat. Off. | H04N 1/40 |
| 0220568A2 | 5/1987 | European Pat. Off. | H04N 1/40 |
| 0421712A2 | 4/1990 | European Pat. Off. | H04N 1/40 |
| 2591367 | 12/1987 | France | H04N 1/00 |

*Primary Examiner*—Peter S. Wong
*Assistant Examiner*—Eric Frahm
*Attorney, Agent, or Firm*—Finnegan, Henderson, Farabow, Garrett & Dunner

[57] ABSTRACT

An apparatus for forming an electrostatic latent image for each pixel on a photoreceptor, wherein each pixel has an imaging unit area and the dot is formed in the imaging unit area. There are provided types of reference wave signals to provide plural different modulating image signals for each pixel so that the dot can be exposed at different positions in the imaging unit area in accordance with position information obtained by processing image signals of pixels neighboring a target pixel.

9 Claims, 31 Drawing Sheets

(1) image data (digital)
(2) reference clock
white (density data is low)
(3) D/A converter output
black (density data is high)
(4) reference wave
(5) comparator output (modulation signal)
(6) latent image formed on photoreceptor

FIG. 21 (a)

| | | |
|---|---|---|
| m1 | m2 | m3 |
| m4 | m5 | m6 |
| m7 | m8 | m9 |

| | | |
|---|---|---|
| S1 | S2 | S3 |
| S4 | S5 | S6 |
| S7 | S8 | S9 |

|  |  |  |
|---|---|---|
| m1=226 | m2=251 | m3=8 |
| m4=200 | m5=45 | m6=7 |
| m7=190 | m8=8 | m9=2 | m5

|  |  |  |
|---|---|---|
| S1=71 | S2=76 | S3=24 |
| S4=65 | S5=32 | S6=24 |
| S7=63 | S8=24 | S9=22 |

⁄⁄ : region relating to S1
≡ : region relating to S2
||| : region relating to S3
∖∖ : region relating to S4

⁄⁄ : region relating to S1
≡ : region relating to S2
||| : region relating to S3
\\ : region relating to S4

IMAGE FORMING APPARATUS WITH NEIGHBORING PIXEL PROCESSING

BACKGROUND OF THE INVENTION

The present invention relates to an image forming apparatus in which a halftone image is reproduced in the following manner: dots are recorded by modulated signals in which density data are modulated by reference wave signals, and in particular, to an image forming method in which pixel density data is modulated.

PRIOR ART

In the field of image forming apparatus using the electrophotographic method, a digital halftone image is reproduced in the following manner: an original image is read by a scanner to get an image signal; and image density data in which the image signal is gradation-corrected, A/D converted, and shading-corrected, is modulated by a reference signal and thus a digital image is obtained.

When an original image is read by the scanner, an edge portion of the image is read in a halftone density due to the aperture of a solid state image pick-up element installed in the scanner. When a latent image is formed on a photoreceptor with a pulse width modulation signal in which the image density data obtained from the image signal is modulated by a reference wave signal having a constant period, a recording pixel corresponding to the edge portion of the latent image is recorded by the method of pulse width modulation in a constant pitch. In the case where the image density is intermediate, dot breakage is generated, and as a result, the sharpness of the recorded image is lowered. Referring to FIG. 14, the aforementioned will be explained as follows. FIG. 14(b) shows a block diagram in which a pulse width modulated signal is generated by comparing the reference wave having a constant period with the image data. The modulated signal is sent to a laser driving circuit, and light-modulates a semiconductor laser 431 in FIG. 4, which will be explained later. A laser beam emitted from the semiconductor laser 431 is raster-scanned by a rotating polygonal mirror, and projected on the photoreceptor through a lens system so that a latent image is formed on the photoreceptor.

FIG. 14(a) is a time chart showing the operation of each block in FIG. 14(b), in which (1) is image data, (2) is a standard clock, (3) is an analog output of image data latched at the leading edge of the standard clock and D/A converted, (4) is a reference wave, and (5) is an output from a comparator.

This image data corresponds to an edge portion of the image in which a line or the like is read. In the image data, it can be seen that intermediate density of the edge exists on "b" and "d" portions in the drawing, however, these portions are recorded separately from "c" portion. This causes a white density-lack portion in the edge portion of the recorded image, and thereby it causes the apparent resolution of the image to be lowered.

On the other hand, even when an interpolated character or figure is formed from computer graphic (C.G.) data or font data, a similar problem is caused. That is, when the edge portion is interpolated smoothly with the intermediate density using the interpolated data, a recording pixel corresponding to the edge portion is recorded in pixels as average density, and thereby the resolution is lowered in the same way as the aforementioned. In the case of FIG. 14, when the image is formed so that the pixels "b" and "d" can be approached to the pixel "c" whose image density is highest, a very sharp image in which the apparent dot breakage is rare, can be formed.

Further, in the present invention, distribution of adjoining pixels is reflected in density distribution of objective recording pixels so that high quality recording can be conducted. The present invention relates to a color image forming apparatus in which: one matrix pixel image data is divided into small pixels m×n (the width×the length) considering the adjoining pixel data, and after that, the center of gravity of each line is found; the phase of the reference wave is deviated according to the center of gravity; and dot recording composed of n small scanning lines is conducted by the modulated signal of the pixel density data modulated by the reference wave signal so that a character and a halftone image can be reproduced. The recording apparatus of the present invention is used for a printing apparatus or a displaying apparatus.

Conventionally, it is widely known that MTF correction for shaping the image can be conducted by a differential filter, a Laplacian filter, or the like in order to maintain the sharpness of the image. However, this emphasizes only the edge portion of the image, so that uniformity of the halftone image is relatively lowered.

For the reasons mentioned above, intermediate density processing, which effectively operates on the edge portion of the image, is required. There is a method in which a triangular wave whose phase is shifted is used as a reference wave, however, there is a problem in which the adjoining pixels are affected in the aforementioned method.

Further, when intermediate density processing is conducted on each color in a color image forming apparatus, there occurs the problem in which color tone is varied, or characters become not sharp.

SUMMARY OF THE INVENTION

In view of the foregoing problems, an object of the present invention is to provide an image forming apparatus in which sharpness and resolution of the image, which is formed from scanner data, C.G data, font data, or the like, is improved.

In order to accomplish the aforementioned object, the present invention provides an image forming apparatus in which recording is conducted by a modulated signal in which image density data is modulated by a reference wave signal, and which is characterized in that: the apparatus has a plurality of reference signals; and an image is formed by selecting one of a plurality of modulated image signals which is obtained when the image density data and a plurality of the reference waves are combined to be compared with each other, according to a calculation result obtained from the image density data to be recorded or the image density data around the aforementioned image density data.

Further, an object of a preferable embodiment is to provide an image forming apparatus in which a plurality of the image signals are image signals in which the image density data to be recorded is pulse-width-modulated, and which is characterized in that a plurality of the image signals include: a first image signal which is modulated so that dots to be formed by the method of pulse width modulation are spread from the center of the pixel positions to be recorded; a second image signal which is modulated so that the dots are spread from the edge of the pixel side which is recorded just before pixel positions to be recorded; and a third image signal which is modulated so that the dots are spread from the edge of the pixel side which is recorded just after pixel positions to be recorded.

Further, another object of the preferable embodiment is to provide an image forming apparatus which is characterized in that a plurality of the reference waves comprises: a first triangular wave whose period corresponds to one clock of the reference clock by which image recording is conducted; a second triangular wave whose period corresponds to twice that of the first triangular wave; and a third triangular wave whose period is the same period as the second triangular wave and is shifted by 180° with respect to the second triangular wave.

The object of the present invention is accomplished by an image forming method in which the image density of an objective pixel is modulated by the reference wave, and which is characterized in that: a modulation signal which corresponds to a specific reference wave is selected from a plurality of reference waves according to density distribution of pixels adjoining the objective pixel; and amplitudes or D.C components of the plurality of reference waves are different.

Further, an object of the present invention is accomplished by an image forming method in which the image density of the objective pixel is modulated by the reference wave, and which is characterized in that the density distribution adjoining the objective pixel and the amplitude of the reference wave are variable.

Another object of the preferred embodiment is to provide the aforementioned two image forming methods which are characterized in that: after the specific reference wave has been selected, the density distribution of the objective pixel is modulated by the selected reference wave.

Further, an object of the present invention is to provide the aforementioned two image forming methods which are characterized in that the modulation signal which corresponds to the specific reference wave is selected after the density of the objective pixel has been modulated by the plurality of reference waves.

The aforementioned object is accomplished by an image forming apparatus in which the density of the objective pixel is modulated and converted into the recording pulse width so that image recording is conducted, and which is characterized in that: triangular waves whose apex positions are different are used corresponding to the density distribution in the objective pixel.

A further object of the preferred embodiment is to provide an image forming apparatus in which a specific reference wave is selected from the plurality of reference waves, or a specific pulse width is selected from the pulse width formed respectively corresponding to a plurality of reference waves.

BRIEF DESCRIPTION OF THE DRAWINGS

FIGS. 13(a), 3(b) and 13(c) are views showing a two dimensional recording image obtained by the method of the present invention.

FIGS. 21(a) and 21(b) are views for explaining RE processing used for determination of phases of reference waves.

DETAILED DESCRIPTION OF THE PREFERRED EMBODIMENT

Figure 4:
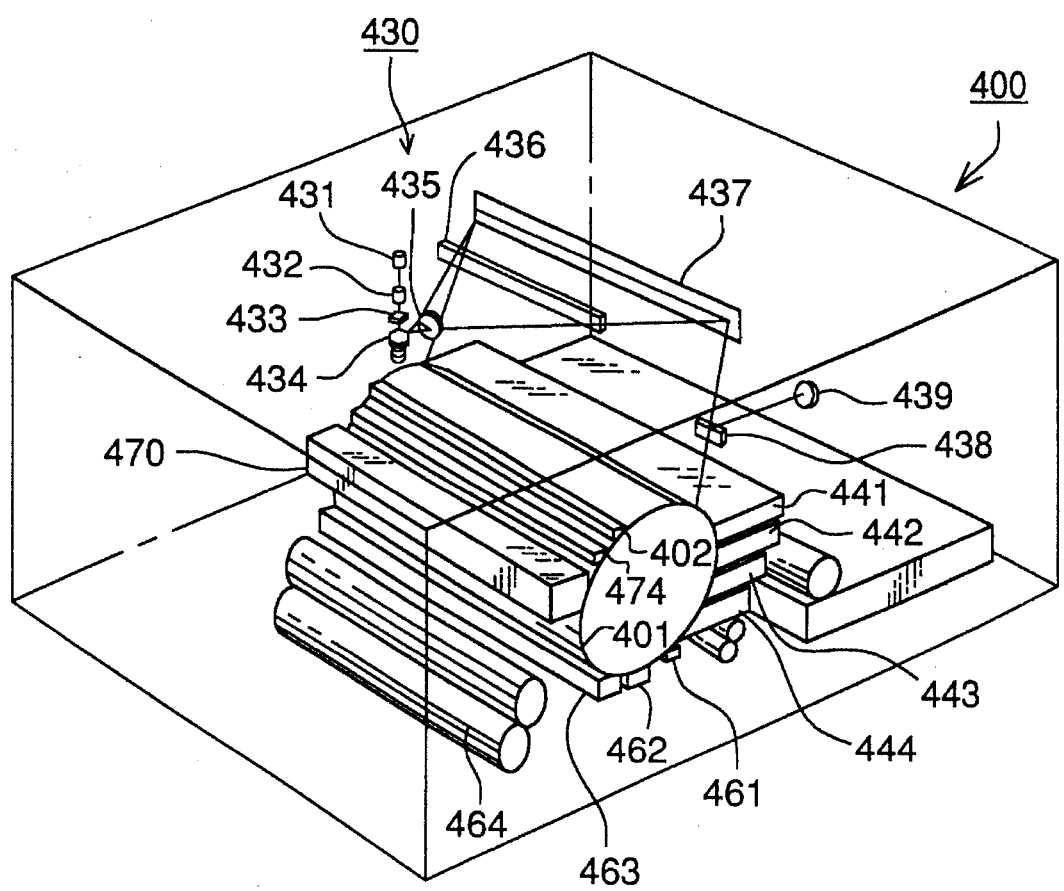
FIG. 4 is a perspective view showing an outline structure of an example of an image forming apparatus to which the present invention is applied.

The structure of an image forming apparatus which is an example of the present invention, will be described as follows. FIG. 4 is a perspective view showing the outline of the structure of the image forming apparatus of the present embodiment.

In image forming apparatus 400, the photoreceptor is uniformly charged; after that, a dot-like electrostatic latent image is formed by a spot light which is pulse width modulated according to a modulation signal obtained by differentially amplifying an analog image density signal, which is obtained by D/A converting digital image density data obtained from a computer or a scanner, and a reference wave signal; a dot-like toner image is formed by reversal development of the latent image; charging, exposing, and developing are repeatedly conducted so that a color toner image can be formed on the photoreceptor; the color toner image is transferred onto a recording sheet; the recording sheet are separated from the photoreceptor; then the image is fixed so that the color image can be obtained; and gradation of the image is expressed by changing areas of dots by pulse width modulation. In the image signal which is made in the computer or read from the scanner, when an edge portion having high image density touches a reading pixel, signal density in the corresponding pixel is the same as intermediate density in a uniform image. In conventional pulse width modulation, the recording dots are formed in the manner that they are isolated at the center of the pixels in the case of recording at an edge portion or in a halftone region, and therefore only an expression in which resolution is rough, can be obtained.

In the image forming apparatus of the present invention, recording position modulation is conducted in which a position of an electrostatic latent image of recording dots is deviated in the primary scanning direction, and the recording dots are enlarged so that an image having improved resolution and gradation can be obtained.

The image forming apparatus 400 is composed of: a photoreceptor which is a drum-like image forming body rotated in the arrowed direction (hereinafter, it will be called simply a photoreceptor) 401; a scorotron charger 402 by which the surface of the photoreceptor 401 is uniformly charged; an optical scanning system 430; developing units 441 to 444 in which yellow, magenta, cyan, and black toner are loaded; a pre-transfer charger 461; a scorotron transfer unit 462; a fixing roller 464; a separator 463; a cleaning unit 470; a discharger 474; and the like.

In the optical system 430, a laser light emitted from the semiconductor laser 431 is made into a nearly parallel beam by the collimeter lens 432. The image is exposed by this laser beam in the following manner: the laser beam passes through a cylindrical lens 433; the laser beam is reflected by a rotational polygonal mirror 434 which is rotated at a constant speed; a minute laser spot is focused on the peripheral surface of the uniformly charged photoreceptor 401 by an fθ lens 435 and a cylindrical lens 436; and then the laser beam becomes a laser spot for scanning the surface and thus the image exposure can be conducted. In the aforementioned optical system, the fθ lens 435 is a correction lens by which a constant speed optical scanning is conducted, and the cylindrical lenses 433 and 436 are lenses by which deviation of the position of the spot is corrected when the rotational polygonal mirror 434 is tilted.

Figure 3:
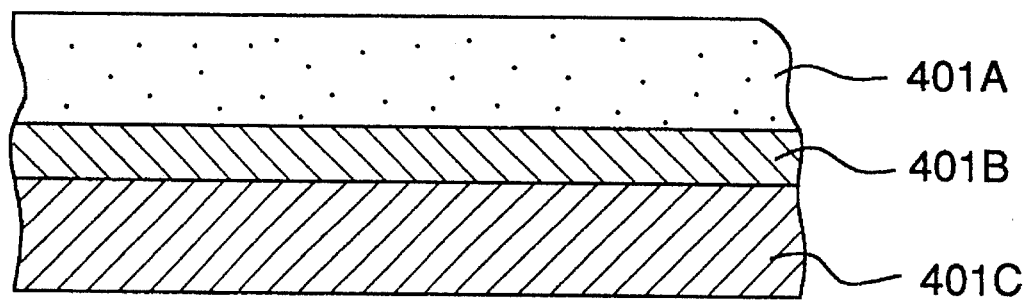
FIG. 3 is a sectional view showing an example of a specific structure of the high γ photoreceptor used in the present embodiment.

The photoreceptor 401 used in the present embodiment has a high γ characteristic and FIG. 3 shows an example of its specific structure.

The photoreceptor 401 is formed by a conductive support 401A, an intermediate layer 401B, and a photosensitive layer 401C, as shown in FIG. 3. Thickness of the photosensitive layer 401C is about 5 to 100 μm, and preferably 10 to 50 μm. The photoreceptor drum 401 is structured in the following manner: a drum-like conductive support 401A, which is made of aluminum and has a diameter of 150 mm; the intermediate layer 401B, which is made of ethylene-acetic acid vinyl copolymer and whose thickness is 0.1 μm, is formed on the conductive support 401A; and the photosensitive layer 401C, whose thickness is 35 μm, is provided on the intermediate layer 401B.

As the conductive support 401A, a drum, which is made of aluminum, steel, copper, or the like, and has a diameter of about 150 mm, is used, however, a belt-like body in which a metal layer is laminated or vapor-deposited on a paper or a plastic film, or a metallic belt such as a nickel belt, which is made by the method of electroforming, may be used as the conductive support. The intermediate layer 401B is preferably provided with the following properties: it can resist high charging voltage of ±500 V to ±2000 V; for example, in the case of positive charging, injection of electrons from the conductive support 401A can be prevented; and holl mobility can be provided so that superior light decay characteristics due to an avalanche phenomenon can be obtained. For the aforementioned reasons, positive charging type electric charge conveyance material, for example, disclosed in Japanese Patent Application No. 188975/1986 which has been proposed by the inventors of the present invention, is preferably added by not more than 10 weight % to the intermediate layer 401B.

For the intermediate layer 401B binder resin, the following resins, for example, which are commomly used for a photosensitive layer of electrophotography, can be used.

(1) vinyl polymer such as polyvinyl alcohol (Poval), polyvinyl methyl ether, and polyvinyl ethyl ether, (2) nitrogen vinyl polymer such as polyvinylamine, poly-N-vinyl imidazole, polyvinyl pyridine (quarternary salt), polyvinyl pyrrolidone, and vinyl pyrrolidone-vinyl acetate copolymer, (3) polyether polymer such as polyethylene oxide, polyethylene glycol, and polypropylene glycol, (4) acrylic acid polymer such as polyacrylic acid and its salt, polyacrylamide, poly-β-hydroxy ethylacrylate, (5) methacrylate polymer such as polymethacrylate and its salt, polymethacrylamide, and polyhydroxy propyl methacrylate, (6) ether cellulose polymer such as methyl cellulose, ethyl cellulose, carboxy methyl cellulose, hydroxy ethyl cellulose, and hydroxy propyl methyl cellulose, (7) polyethylene imine polymer such as polyethylene imine, (8) polyamino acid such as polyalanine, polyserine, poly-L-glutamine acid, poly-(hydroxy ethyl)-L-glutamine, poly-δ-carboxy methyl-L-cysteine, polyproline, lysine-tyrosine copolymer, glutamic acid-lysine-alanine copolymer, silk fibroin, and casein, (9) starch and its derivatives such as starch acetate, hydroxyl ethyl starch, starch acetate, hydroxy ethyl starch, amine starch, and phosphate starch,

(10) polymer which is soluble in mixed solvent of water and alcohol, such as soluble nylon, and methoxy methyl nylon (8 type nylon) which are polyamide.

The electric charge conveyance material is not used for the photosensitive layer 401C basically, and the photosensitive layer 401C is formed by the following manner: phthalocyanine fine particles, which are made of photoconductive pigment and whose diameter is 0.1 to 1 μm, antioxidant and binder resin are mixed and dispersed in a solvent for the binder resin so that a coating liquid is prepared; the coating liquid is coated on the intermediate layer; and it is dried and thermally processed.

When the photoconductive material is used with the electric charge conveyance material, the photosensitive layer is structured in the following manner: the photoconductive material which is composed of the photoconductive pigment and a small amount of the electric charge conveyance material whose weight % is not more than 1/5, and preferably 1/1000 to 1/10 (weight ratio) to the photoconductive pigment, and the antioxidant are dispersed into the binder resin. When the high γ photoreceptor is used, a sharp latent image can be formed even when the diameter of the laser beam is spread, and thereby recording can be effectively conducted with high resolution.

In the present example, since color toner images are superimposed on the photoreceptor 401 surface, the photoreceptor, which has the spectral sensitivity on the infrared side, and a laser diode, which emits an infrared ray, are used so that a laser beam emitted from the optical scanning system 430 is not shaded by the color toner images.

Next, light decay characteristics of the high γ photoreceptor used in the present example, will be explained as follows.

Figure 2:
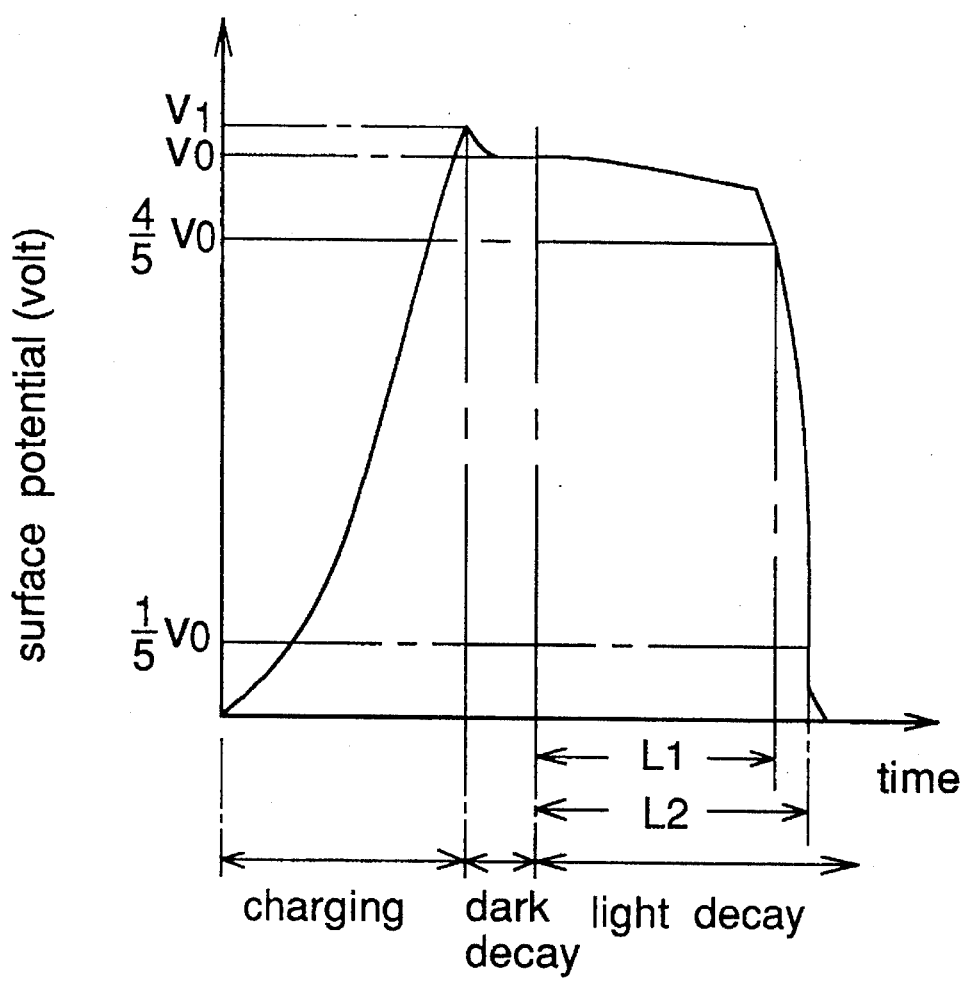
FIG. 2 is a characteristic curve of a high γ photoreceptor used in the present embodiment.

FIG. 2 is a graph showing characteristics of the high γ photoreceptor. In the drawing, V1 (Volts) is a charging potential, $V_0$ (Volts) is an initial potential before exposure, $L_1$ is an amount of exposure (μJ/cm$^2$) by a laser beam which is necessary for that the initial potential $V_0$ is decayed to 9/10, and $L_2$ is an amount of exposure (μJ/cm$^2$) by a laser beam which is necessary for that the initial potential $V_0$ is decayed to 1/5.

A preferable range of $L_2/L_1$ is $$1.0 < L_2/L_1 \leq 1.5$$

In the example, $V_1$=1000 (Volts), $V_0$=950 (Volts), $L_2/L_1$=1.2, and the photoreceptor surface potential at the exposed section is 10 Volts.

When the light sensitivity at the position corresponding to a middle period of exposure at which the initial potential ($V_0$) is decayed to 1/2 in the light decay curve is defined as E1/2, and that at the position corresponding to an initial period of the exposure at which the initial potential ($V_0$) is decayed to 9/10 is defined as E9/10, a photoconductive semiconductor which gives the following relations is selected.

$$(E½)/(E9/10) \geq 2$$

and preferably, $$(E½)/(E9/10) \geq 5$$

In the aforementioned, the light sensitivity is defined as the absolute value of the potential lowering amount to a minute amount of exposure.

In the light decay curve of the photoreceptor 401, the absolute value of the differential factor of the potential characteristics, which means the light sensitivity, is small, as shown in FIG. 2, at the time of a small amount of exposing light, and it sharply increases when the amount of exposing light reaches an increased point. That is, the light decay curve shows the following characteristics: it shows almost horizontal light decay characteristics because sensitivity characteristics are not good for a small period of time at the initial period $L_1$ of exposure, as shown in FIG. 2; and however, it shows super high γ characteristics which is lowered almost vertically because it has super high sensitivity, ranging from the middle period of exposure to the latter period thereof. It is considered that the photoreceptor 401 has a high γ characteristic, due to the avalanche phenomenon under the high charging voltage of, specifically, +500 to +2000 V. That is, it is considered that carriers generated on the surface of photoconductive pigment at the initial period of exposure are effectively trapped by an interface layer of the pigment and coated resin so that the light decay is positively prevented, and thereby extremely sudden avalanche phenomenon is generated after the middle period of exposure.

Figure 1:
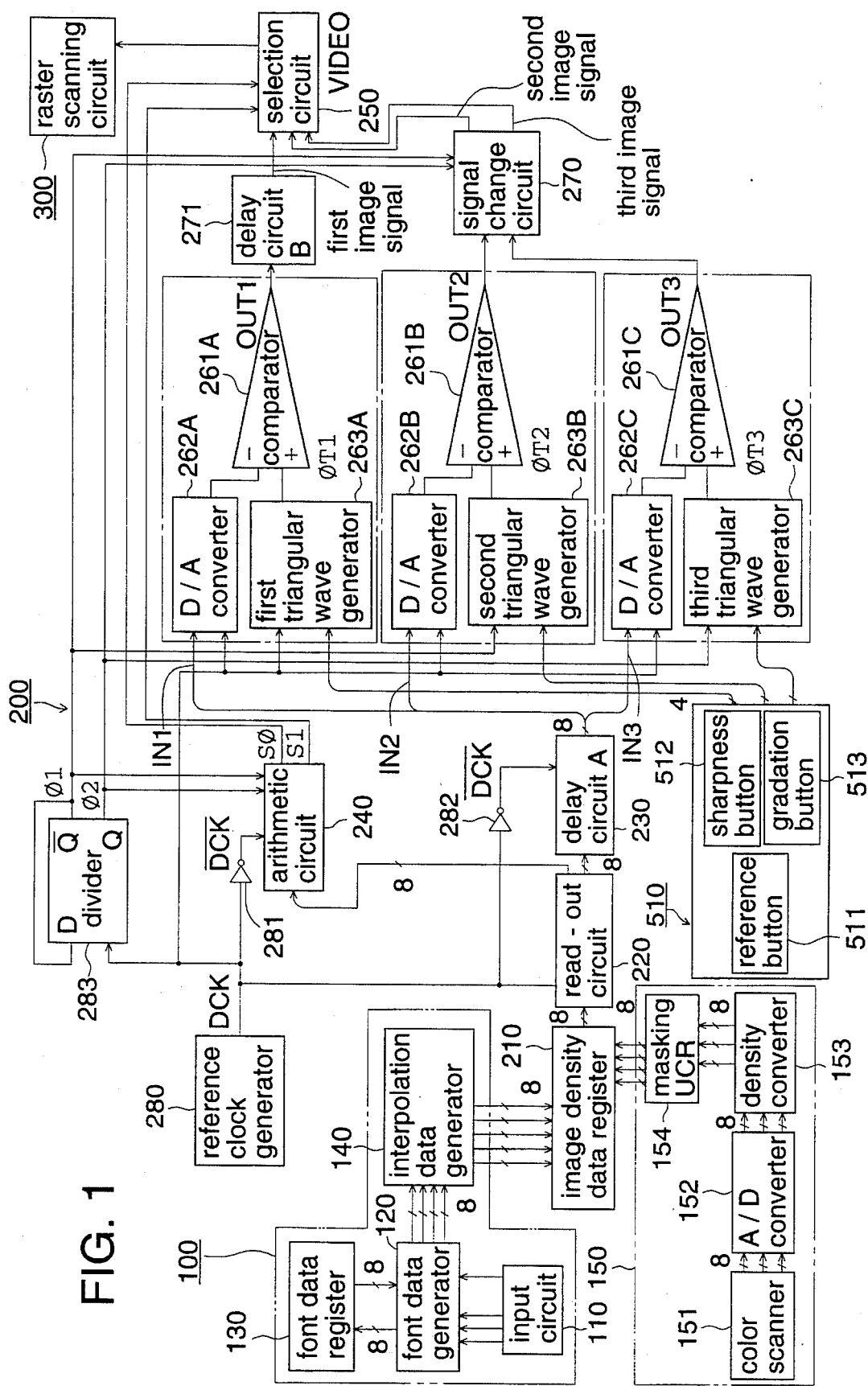
FIG. 1 is a block diagram showing an image processing circuit of the embodiment to which the present invention is applied.

FIG. 1 is a block diagram showing an example of an image processing circuit used in the image forming apparatus of the present invention.

An image processing circuit 1000 of the present embodiment is a circuit by which a driving circuit of the optical scanning system 430 is structured, and composed of an image data processing circuit 100, a modulation signal generator 200, a raster scanning circuit 300, and an amplitude data generator 510.

The amplitude data generator 510 generates amplitude data of 4 bits, for example, by which the amplitude of a triangular wave, which is a reference wave and will be described later, is determined, and sends the data of large amplitude to modulation circuits 260A to 260C when a sharpness button 512 to improve the sharpness, and a gradation button 513 to improve the gradation, which are provided on an operational panel not shown in the drawing, are pressed. Numeral 511 is a standard button by which the operation is returned from the condition in which the sharpness button 512 or the gradation button 513 is pressed to the standard condition, and it is automatically returned to the standard condition when the image forming process is completed. At the standard condition, as the amplitude data a digital signal of 8, for example, is sent to modulation circuits 260A to 260C, and when the sharpness button 512 is pressed, as the amplitude data, a digital signal of 12, for example, is sent to two triangular wave generators 262B and 262C provided in the modulation circuits 260B and 260C as the amplitude data. When the gradation button 513 is pressed, an amplitude data of 12, for example, is sent to the triangular wave generators 262A, 262B And 262C. The amplitude data generator 510 is not limited to output the fixed amplitude data, but it may be structured in the manner that the amplitude data generator 510 can output the data which is sequentially varied, by using a slide resistor or the like. Further, it may be structured in the manner that it can send different amplitude data to the triangular wave generators 262A, 262B, and 262C respectively.

The image data processing circuit 100 is a circuit which interpolates an edge portion of font data and outputs it, and is composed of: an input circuit 110 composed of a computer; a font data generator 120; a font data memory circuit 130; and an interpolation data generator 140. The image data processing circuit 100 sends a character code signal, a size code signal, a position code signal, and a color code signal to a font data generator 120. The font data generator 120 selects an address signal from four kinds of input signals and sends it to the font data memory circuit 130. The font data memory circuit 130 sends font data corresponding to one character, which corresponds to an address signal, to the font data generator 120. The font data generator 120 sends the font data to the interpolation data generator 140. The interpolation data generator 140 interpolates notches of the image density data generated in the edge portion of the font data with intermediate density, and sends it to an image density data memory circuit 210. Concerning generated color, a corresponding color is converted into density data of yellow(Y), magenta(M), cyan(C), black(BK) respectively in accordance with the color code. Due to the aforementioned, font data is bit-map-developed in each frame memory under the condition that each color has the same configuration and a density ratio of each color is different.

The modulation signal generator 200 functions as follows: it reads out the image density data obtained from one scanning line out of the image density data memory circuit 210. The image density data to be recorded from the continuous image density data obtained from one scanning line and its surrounding image density data are calculated in an arithmetic circuit 240; and according to the result, the first image signal which is obtained from an output from the modulation circuit 260A is delayed in a delay circuit B 271 by the first triangular wave, the second image signal and the third image signal which are obtained, respectively, from an output from the modulation circuit 260B with the second triangular wave and an output from the modulation circuit 260C with the third triangular wave are passed through a replacing circuit 270 alternately every half period, are switched over in a selector circuit 250, and the continuous modulation signal in one scanning line unit is sent to the raster scanning circuit 300 which has a driving means for a semiconductor laser 431.

The modulation signal generator 200 is composed of: a image density data memory circuit 210; read-out circuit 220, a delay circuit A 230; an arithmetic circuit 240; selector circuit 250; modulation circuits 260A to 260C for the first to third triangular waves; a signal replacing circuit 270; a delay circuit B 271; a standard clock generator 280; inverters 281 and 282; and divider 283.

The image density data memory circuit 210 is a page memory, (which will be referred to as a page memory 210, hereinafter), and a RAM (a random access memory) which stores the data of one page, and has a storage capacity which can store multi-value image density data, which corresponds to at least one page (one image frame). Further, a page memory in which the image density data corresponding to color components of a plurality of colors, for example, yellow, magenta, cyan and black, can be stored, is provided when the device is adopted to a color printer.

The read-out circuit 220 reads out the continuous image density data in one scanning line unit in synchronized relation with standard clock DCK from the image density data memory circuit (page memory) 210, wherein an index signal, by which the first timing of a raster scan is determined, is used as a trigger, and sends the data to the delay circuit A 230 and the arithmetic circuit 240.

The arithmetic circuit 240 reads the continuous image density data in one scanning line unit in synchronized relation with a rising edge of a clock pulse, and conducts a differential operation successively between pixel data which are from the just before image density data to the just after image density data to the image density data to be recorded. This differential operation is conducted so that the just before pixel data is subtracted from the just after pixel data. Further, the arithmetic circuit 240 determines data switching signals S0 and S1 according to the differential value, and sends them to the selector circuit 250. In the circuit 240, when the differential value is more than a specific value $\alpha$, "1" is output for S0, and when the differential value ms not more than $-\alpha$, "1" is output for S1. When the differential value is not more than the specific value $\alpha$ and not less than $-\alpha$, "0" is output for both S0 and S1. That is, when S0 is 1, the pixel recorded just after 'the pixel to be recorded' in the pixels positioned at both sides has higher density than the other, and when S1 is 1, the pixel recorded just before 'the pixel to be recorded' has higher density than the other. The above described operation and determination of S0 and S1 is conducted by the following methods: a ROM addressed by two system image density data on which the differential operation is conducted, is provided; the value of S0 and S1 which is generated according to the combination of the two system data, is written in a data section of the ROM; and the data is used as S0, or S1.

The delay circuit A 230 is the circuit in which the image density data is delayed by the time when processing is conducted in the arithmetic circuit 240, and in particular, it is structured by a shift register which is synchronized with the rising clock.

The selector circuit 250 is, specifically, a data selector which changes over the first, the second and the third image signals by each one pixel according to the switchover signals S1 or S2, asynchronously with the clock, and outputs them to the raster scanning circuit 300.

Thus, when both S0 and S1 are 0, the selector circuit 250 selects the first image signal and outputs it, and when S0 is 0, and S1 is 1, the circuit selects the second image signal and outputs it, and when SO is 1, and S1 is 0, the circuit selects the third image signal and outputs it.

The first image signal is the signal which is pulse width modulated in the manner that the signal is spread from the center of the position of 'the pixel to be recorded'. The second image signal is the signal which is pulse width modulated in the manner that the signal is spread from an edge of the pixel side recorded just before the position of 'the pixel to be recorded'. The third image signal is the signal which is pulse width modulated in the manner that the signal is spread from an edge of the pixel side which will be recorded just after the position of 'the pixel to be recorded'.

Means which generates the first, second, and third image signals from the image data of 'the pixel to be recorded', is composed of: modulation circuits 260A to 260C; the signal replacing circuit 270; the delay circuit B 271; the divider 283 and the standard clock DCK; and a circuit using $\overline{DCK}$ obtained from inverters 281 and 282 which invert the standard clock.

Modulation circuits 260A to 260C have basically the same structure as each other, and they are composed of: high speed comparators 261A to 261C; D/A converters 262A to 262C which convert the image data into analog signals; and triangular wave generators 263A to 263C which generate the first, the second, and the third triangular waves corresponding to the impressed clock signal.

Figure 9:
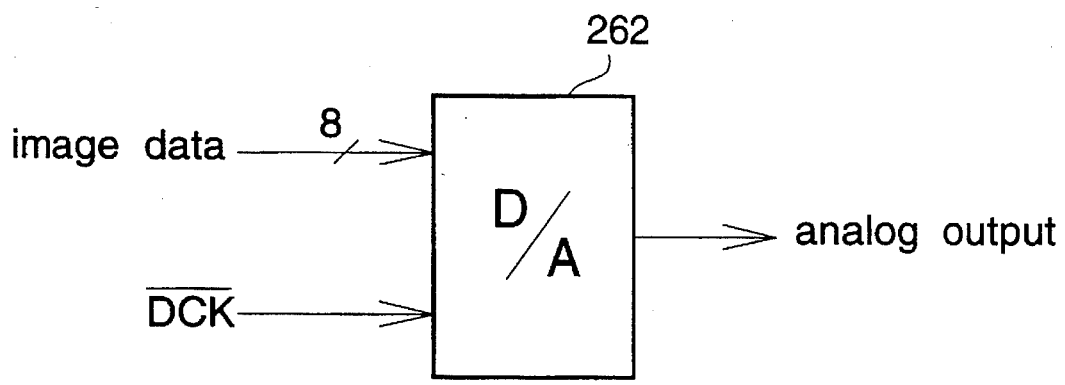
FIG. 9(a) is a D/A converter.
FIG. 9(b) is a timing chart for the D/A converter of FIG. 9(a).
Figure 9:
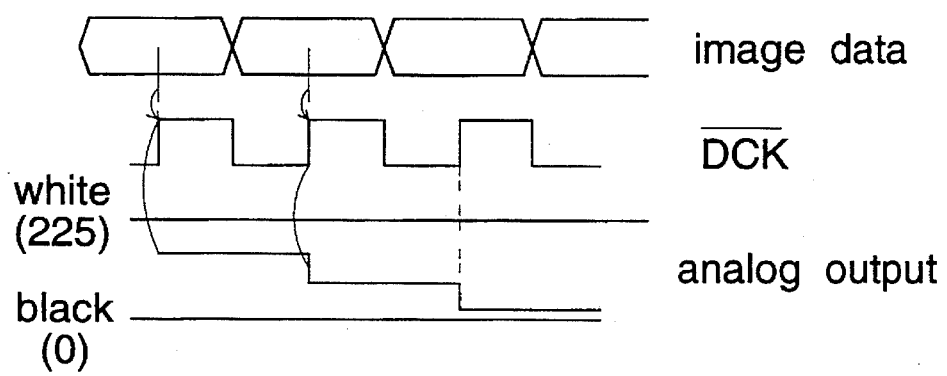

D/A converters 262A to 262C are shown in FIG. 9, and they conduct sampling on the image data (8 bits, in this case) at the rising point of the clock pulse of $\overline{DCK}$ and output the analog output, and a timing chart is shown in FIG. 9(b).

The D/A converter outputs analog data linearly corresponding to the value of inputted image data total ranging from 0 to 255 (8 bits).

In view of noises or crosstalk of an analog signal caused due to wiring of analog circuits, three systems of D/A converters are used in this embodiment, however one system of D/A converter can be used instead of the three systems of D/A converters since the same analog data processing is conducted in this system.

Triangular wave generators 263A to 263C are, specifically, structured by an integral circuit composed of: a transistor Tr1; a variable resistor 2631; a capacitor C1; a transistor Tr2; a variable resistor VR2, and the like, as shown in FIG. 10(a). The variable voltage type resistance element D7500 made by Sony Co.,Ltd., for example, can be used for the variable resistor 2631. The variable voltage type resistance element is an element in which resistance value can be varied when control voltage of 0 to −5 V is inputted into its control terminal. When amplitude data of 4 bits is inputted into the terminal b in the case where a sharpness button 512 or a gradation button 513, which will be described later, provided on the operational panel of the image forming apparatus is pressed, the data is converted into an analog value by the D/A converter 2632, and further, its polarity is reversed by a reversal amplifier 2633, and the converted data is inputted into the variable resistor 2631 as control voltage. The resistance value which is determined by the control input, is defined as R1.

A clock which is inputted into a terminal a, is integrated by its voltage amplitude, period, and time constant of C1·R1. As a result, a triangular wave as shown in FIG. 10(b) is generated. Exactly speaking, the triangular wave which is generated in this circuit is formed by a charging curve and discharging curve of the capacitor C1, and deviated slightly from the exact triangular wave. However, the deviation can be practically disregarded, so that there is an advantage that the circuit can be simple.

Voltage amplitude of the triangular wave can be properly adjusted by changing the time constant of C1·R1. In this embodiment, C1 is fixed, and R1 can be changed. The voltage amplitude of the triangular wave is adjusted so that it can be equal to the standard amplitude which is equal to the entire amplitude when the D/A converters 262A to 262C output the image data on its full range in the case where a median, for example, 8, of the amplitude data is inputted. Further, VR2 is adjusted so that voltage level of the triangular wave coincides with that of D/A converters 262A to 262C. Due to the aforementioned, voltage amplitude of the triangular wave can be adjusted to be 1 to 1.6 times of the standard amplitude when the amplitude data is changed.

When voltage amplitude is fixed, triangular wave generators 263A to 263C are structured, as shown in FIG. 10(c), by an integrated circuit composed of an operational amplifier, C, R, and a power source for a substrate E.

A clock impressed by the circuit in the drawing, is integrated by voltage amplitude and a period of a signal, and a time constant of C·R1 of the circuit, and as a result, the triangular wave is generated as shown in FIG. 10(b).

Voltage amplitude of the triangular wave can be properly adjusted when the time constant of C·R1 is changed. In this embodiment, C is fixed, and R1 can be adjusted. R2 is provided so that the circuit can be stably operated, and has no relation directly to the present invention. Voltage amplitude of the triangular wave is adjusted by R1 so that it can be equal to the entire amplitude in the case where the D/A converter outputs the image data on its full range, and further, standard power source E is adjusted so that a voltage level of the triangular wave is equal to that of the D/A converter, and offset voltage is given to the output.

A clock which is inputted into the triangular wave generator, is structured by different clocks as shown in FIG. 1. The clock is structured in the following manner: the standard clock DCK is inputted into the first triangular generator 263A; $\overline{Q}$ output φ1 in which DCK is divided into two by a divider 283 composed of D-flip-flop, is inputted into the second triangular wave generator 263B; and Q output φ2 in which DCK is divided by the divider 283 is inputted into the third triangular wave generator 263C.

A triangular wave φ T1 which is generated in the triangular wave generator 263A by the DCK, is the first triangular wave whose period is equal to that of the standard clock DCK, a triangular wave φ T2 which is generated in the triangular wave generator 263B by φ1 is the second triangular wave whose period is twice that of φ T1, and a triangular wave φ T3 which is generated in the triangular generator 263C by φ2 is the third triangular wave whose period is the same as that of φ T2 and whose phase is shifted by 180°. These conditions are shown in a timing chart in FIG. 11. The triangular wave shown by a one-dotted chain line shows a triangular wave which is generated when amplitude data larger than the standard value is inputted.

An image data which is compared with the first,second and third triangular waves, is given the same data in D/A converters 262A to 262C. This condition is shown in the triangular wave in FIG. 11 by a dotted line.

Figure 11:
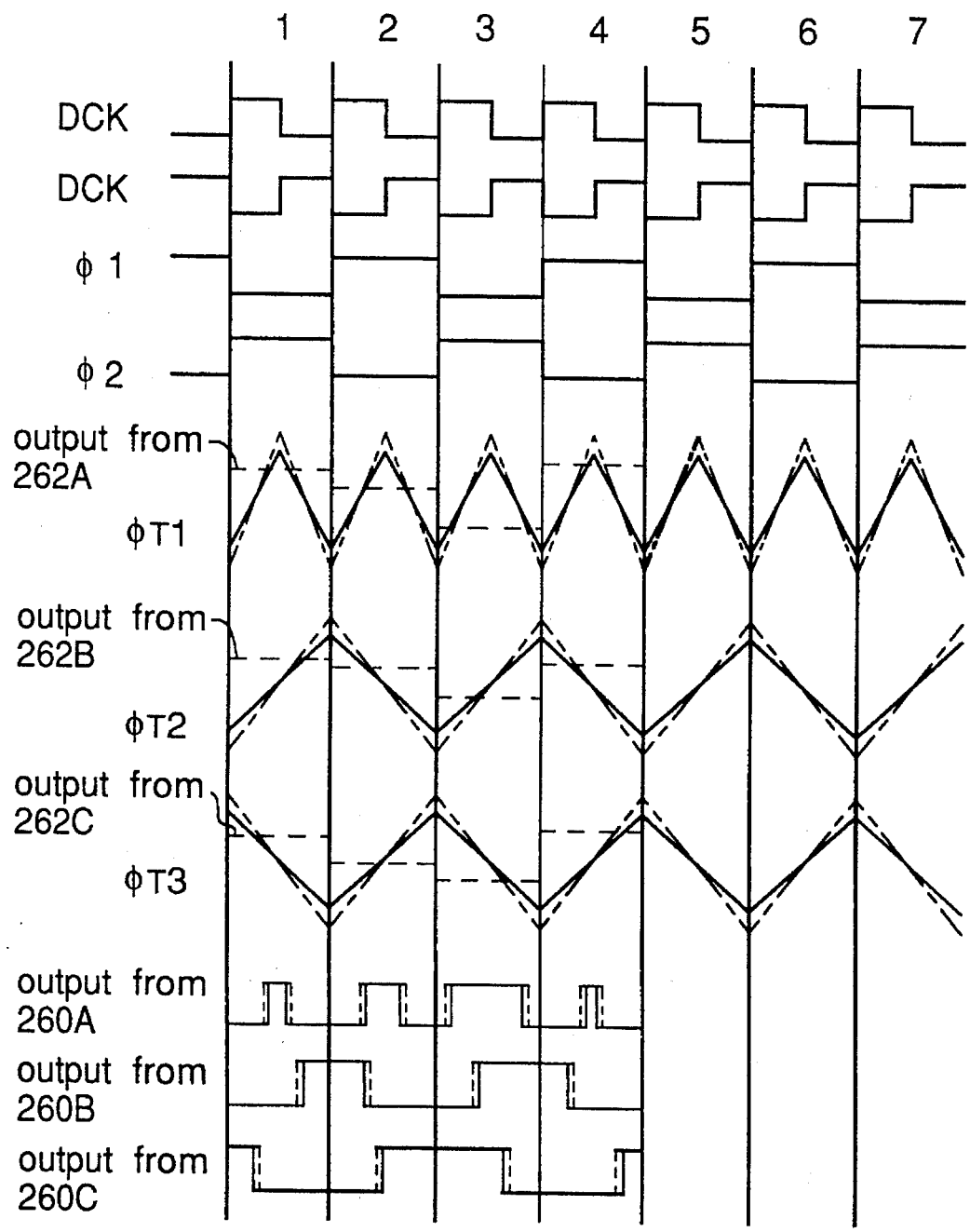
FIG. 11 is a view showing an image signal output in the case where the pulse width modulation is conducted by comparing the image data with three triangular waves.

Pulse width modulation outputs from modulators 260A to 260C obtained by comparing the data in the comparator are shown in FIG. 11 (hereinafter, outputs from modulators 260A to 260C will be referred to as 260A output, 260B output, and 260C output). A wave form shown by a one-dotted chain line shows a pulse width modulation output in the triangular wave whose amplitude is enlarged.

As shown in FIG. 11, at the phase 1 of the standard clock DCK, image signal outputs obtained by pulse width modulation are explained as follows: the 260A output is pulse width modulated to spread from the central position of 'the pixel to be recorded'; the 260B output is pulse width modulated to spread from the edge of the pixel which will be recorded just after 'the pixel to be recorded'; and the 260C output is pulse width modulated to spread from the edge of the pixel which has been recorded just before 'the pixel to be recorded'.

It can be understood that, when the amplitude of the reference wave is enlarged, the pulse width corresponding to low density is large, as shown by a one-dotted chain line, and the pulse width corresponding to high density is small, so that the gradation property is improved. Although not shown in the drawing, when a D.C component of the reference wave is changed, the density can be changed since the pulse width can be changed uniformly from low density to high density.

When a plurality of reference waves are changed independently, the degree of emphasis on the modulation of the recording position can be changed. For example, when a D.C. component of the reference wave which records the density from the edge portion of the pixel, is set at a higher level than that in the case where the recording density is recorded from the central portion of the pixel, the modulation of the recording position is emphasized since the edge portion of the image is emphasized.

The pulse width modulated outputs of the 260B and the 260C are replaced with each other in the spread direction at every one period of DCK, and therefore the 260B output and the 260C output replace each other at every one period of the standard clock. The signal replacing circuit 270 is for that use.

Figure 12:
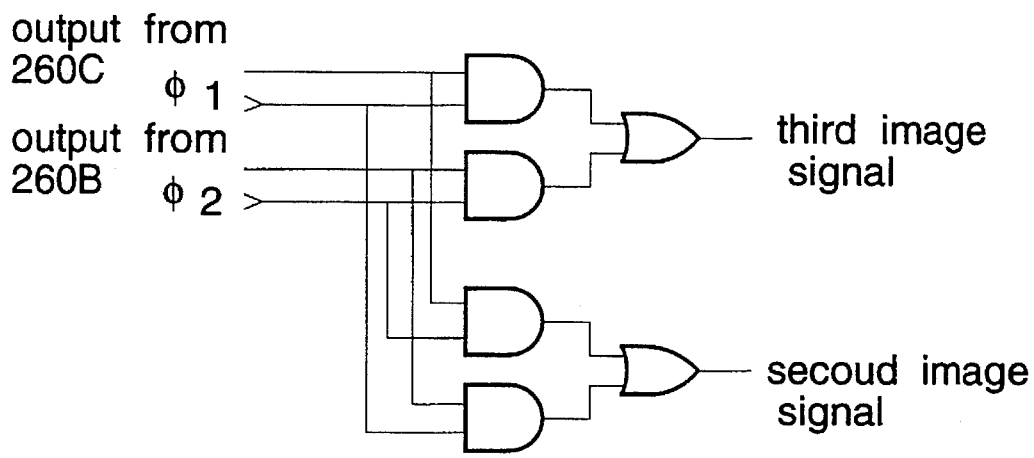
FIG. 12(a) is a view showing a signal change circuit.
FIG. 12(b) is a timing chart for the circuit of FIG. 12(a).
Figure 12:
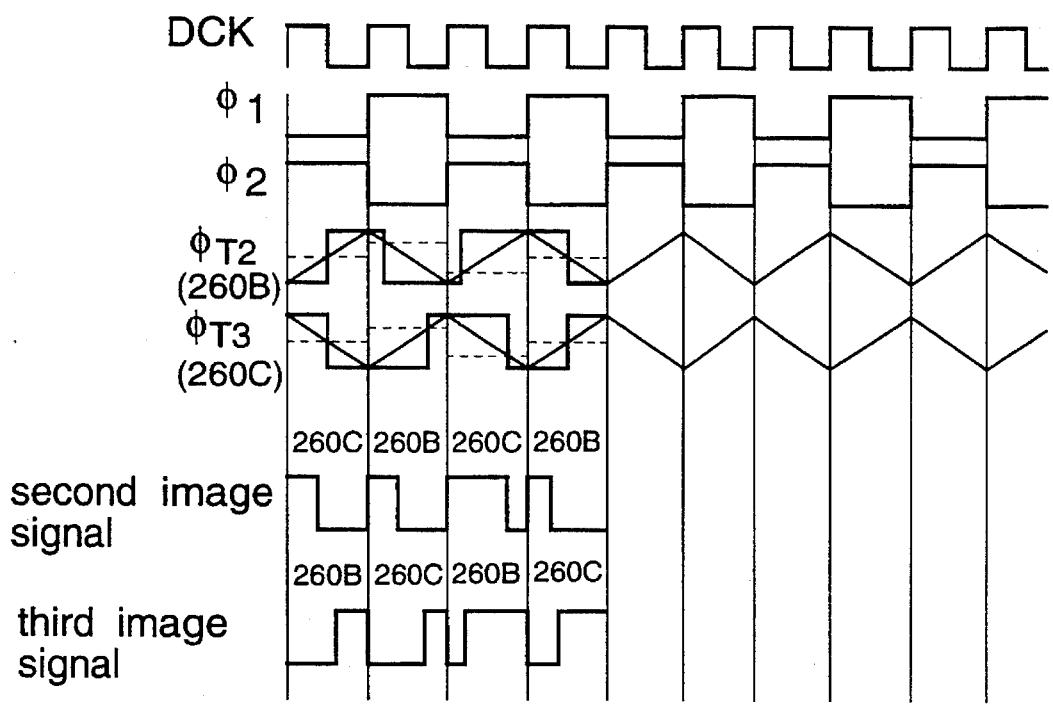

The signal replacing circuit 270 is composed of a combination of an AND circuit and an OR circuit shown in FIG. 12(a). In an operation of the signal replacing circuit 270, the following can be understood from the timing chart in FIG. 12(b): the modulation signal of the modulator 260C is replaced with that of the modulator 260B at every one period of DCK, and a row of the second image signals which is modulated in the manner that the pulse width is spread from the edge of the pixel which has been recorded just before the position of 'the pixel to be recorded', and a row of the third image signals which is modulated in the manner that the pulse width is spread from the edge of the pixel which will be recorded just after the position of the 'pixel to be recorded', are obtained.

The circuit structure in which the operation is conducted by a combination of triangular waves as described above, is adopted in order to prevent the following problems: when the reference wave is generated in the saw-tooth-shape previously, a high speed circuit structure is necessary; and thereby the circuit becomes complicated; and when the circuit is assembled into a machine, radiation noises are increased. When this circuit is adopted in the image forming apparatus, the objective functions can be accomplished easily.

A delay circuit B 271 provided after the 260A output is a delay circuit which is provided so that the time delayed can be matched by the signal replacing circuit 270. Due to this circuit, the timing of the output of the signal replacing circuit 270 can coincide with that of the 260A output.

A row of image signals generated by the aforementioned circuits is processed in the raster scanning circuit 300, provided after the selector circuit, as a raster scanning signal so that image recording onto the photoreceptor can be conducted.

The raster scanning circuit 300 is provided with an LD driving circuit, an index detecting circuit, and a polygonal mirror driver which are not shown in the drawing.

In the index detecting circuit, the following operations are conducted: the position of the surface of the rotating polygonal mirror 434, which is rotated at a predetermined speed, is detected by an index signal from an index sensor 439; and optical scanning according to the modulated image density signal is conducted by the raster scanning method at the period of the primary scanning direction. In the aforementioned, scanning frequency is 2204.72 Hz, the effective printing width is not less than 297 mm, and the effective exposing width is not less than 306 mm.

The polygonal mirror driver rotates a D.C. motor at a predetermined speed uniformly, and rotates the rotating polygonal mirror 434 at 16535.4 rpm.

The aforementioned image processing circuit 1000 is explained as the circuit for use in a laser printer. However, it is not limited to the laser printer, but it can be used for other image forming apparatus such as a copying apparatus or the like when a circuit, in which inputting of image density data from a scanner and image processing are conducted, is used instead of the image data processing circuit 100 and the image data processing circuit 150 composed of a color scanner 151, an A/D converter 152, a density converter 153, and a masking UCR circuit 154.

Figure 5:
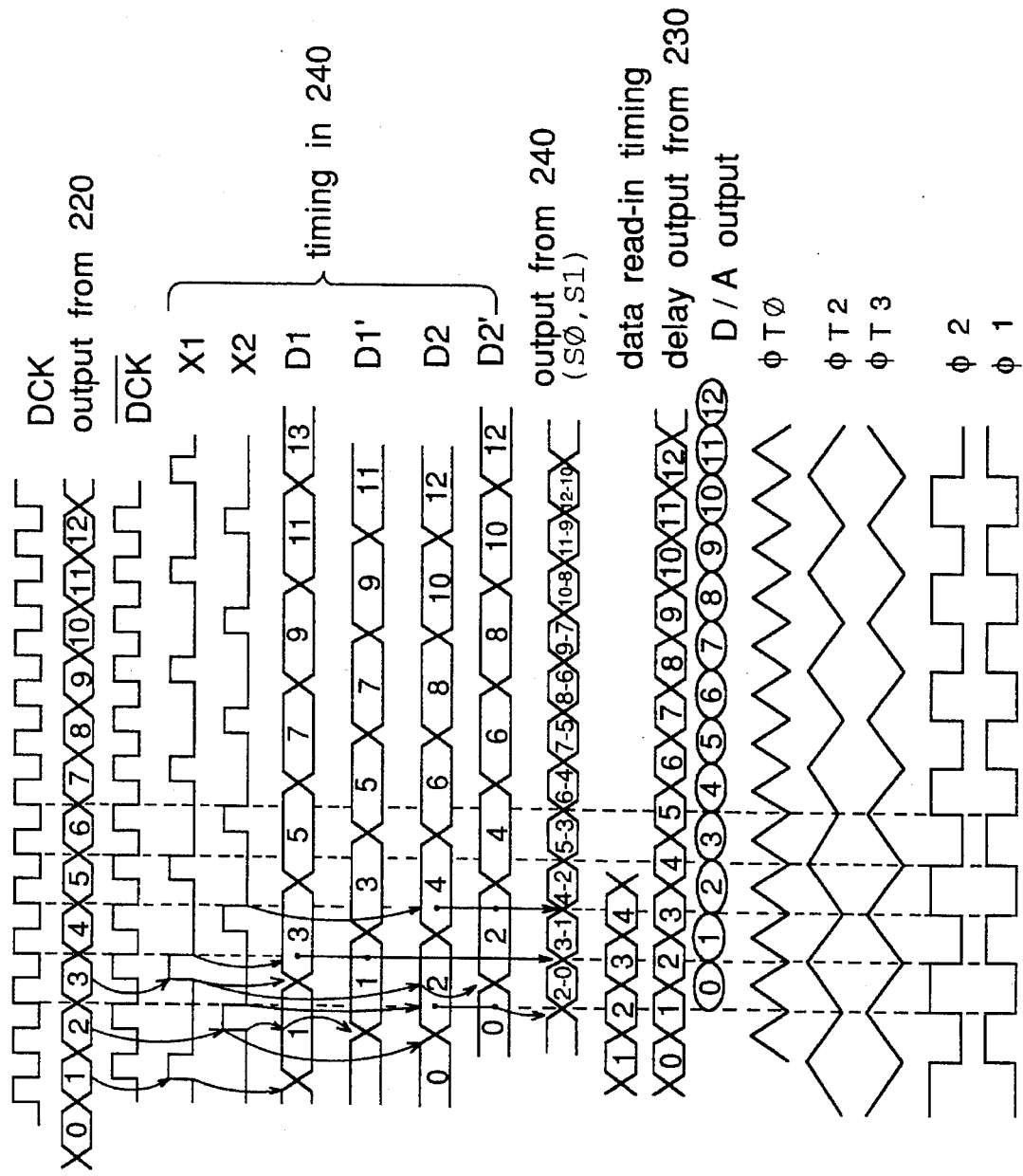
FIG. 5 is a timing chart of image data processing portions.
Figure 6:
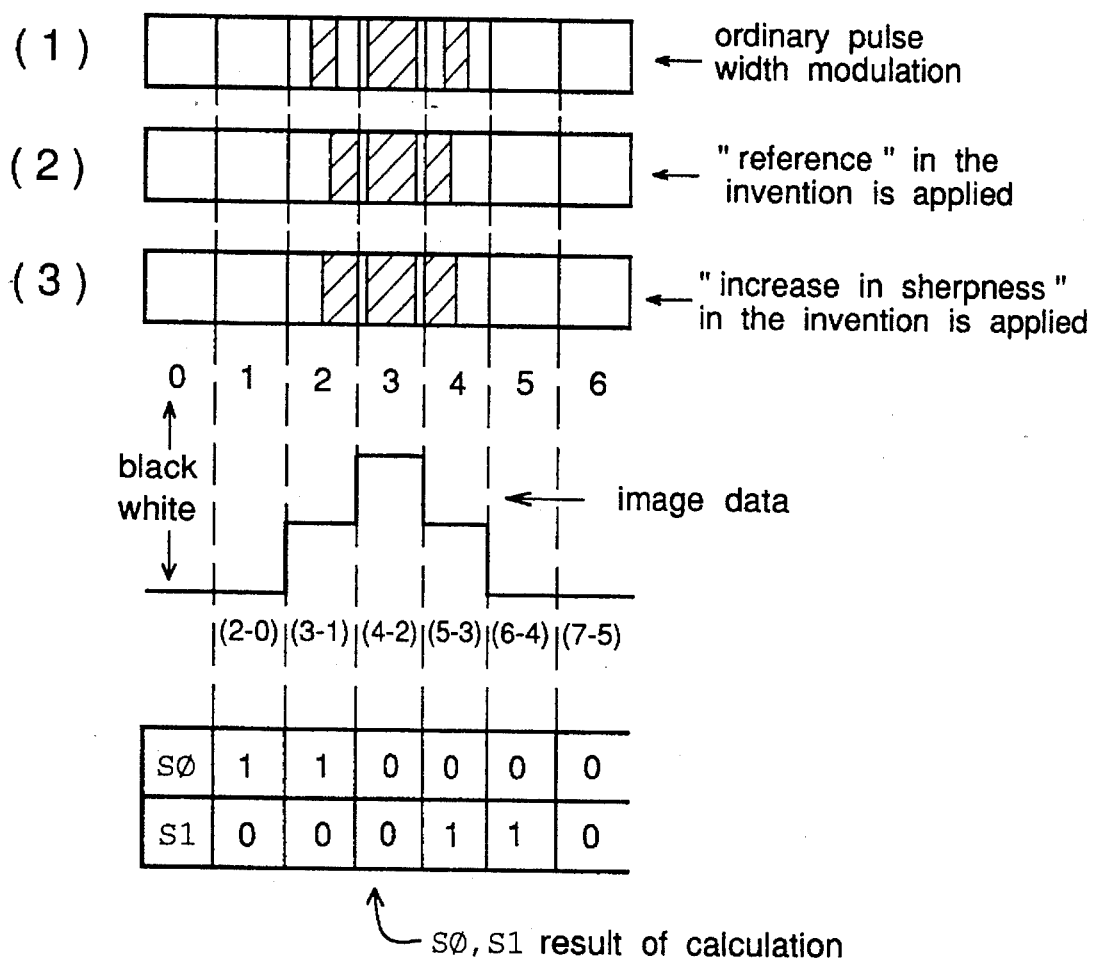
FIG. 6 is a view in the case where a latent image is formed by the modulation signal shown in FIG. 5.

FIG. 5 shows collectively timing charts concerning processing circuits of the main image data to generate modulation signals from the image processing apparatus of the present embodiment, and FIG. 6 is a schematic illustration showing a model of latent image formation.

In the image forming apparatus 400 of the present embodiment, the gradation is expressed by changing a dot's area. Further, in the image signal which is generated by a computer, or read in by a scanner, as described above, a signal in the corresponding pixel has the same density as the intermediate density in the uniform image when an edge portion having high image density overlaps with a reading pixel. When this method is not accepted and a reference wave of a constant frequency is used, the image data corresponding to an edge of a line as shown in FIG. 6(1) is recorded in the central portion of the pixel, being isolated from the other portions of the image data as shown in the drawing. When this processing method in FIG. 6(2) is conducted, left and right intermediate density data approaches the pixel which has high pixel density in the central portion, and they are recorded, so that the white density lack portion, which breaks the density, is scarcely generated compared with the conventional method, and the apparent image sharpness is improved. Further, when processing of this method is conducted so that sharpness is improved, (that is, amplitude of the first triangular wave is not changed, and D.C. components of the second, and third triangular waves are increased), a recording width of the edge portion is enlarged, and the white density lack portion is less likely, so that the sharpness of the image is further improved. When processing of this method is conducted in the low density portion so that the gradation is improved, amplitude of all the first, second, and third triangular waves is enlarged, so that a change of the modulated pulse width becomes small, and thereby γ characteristics and gradation can be improved. The aforementioned sharpness can be improved by the following methods: amplitude of the triangular wave is not changed; and the second and third triangular waves are shifted upwardly by the method in which their D.C components are changed by adjusting VR2 provided in the triangular wave generator 263.

Figure 13:
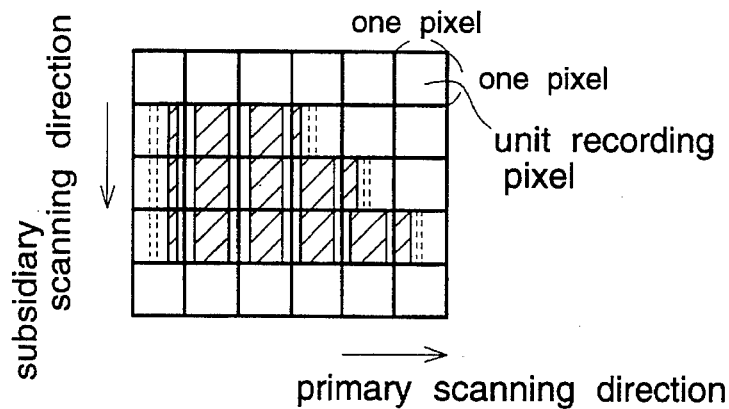
Figure 13:
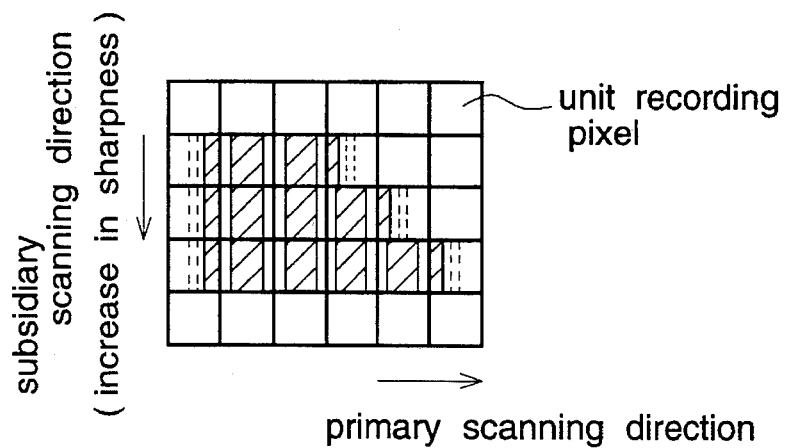
Figure 13:
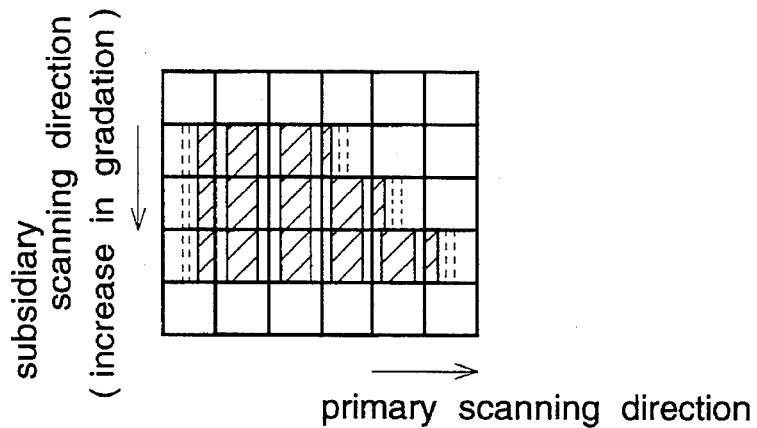
Figure 14:
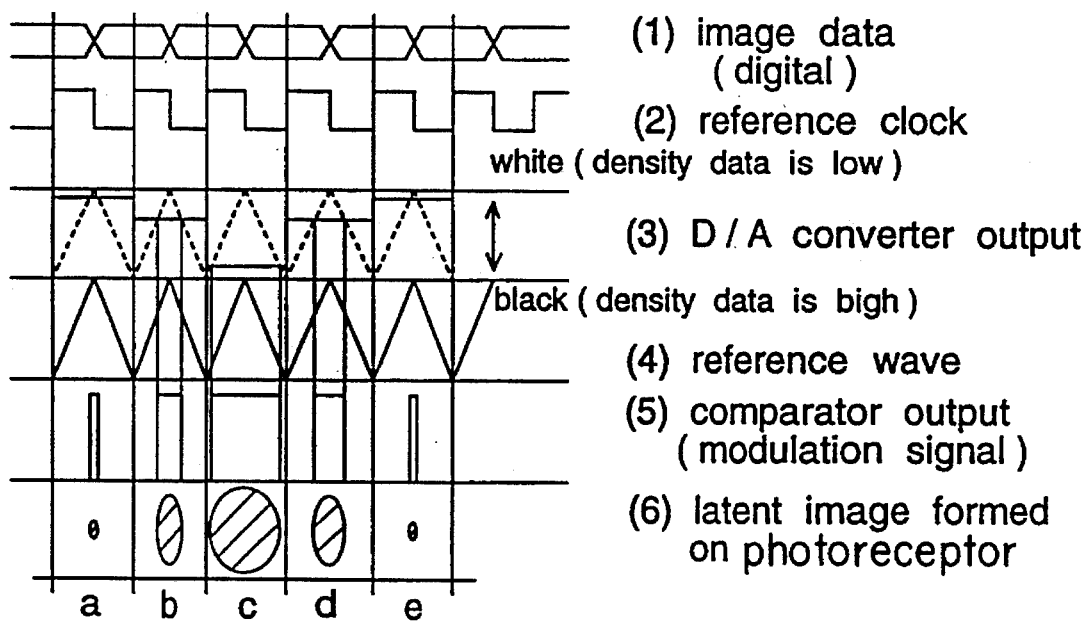
FIG. 14-B is a block diagram in which a reference wave with a constant period are compared with the image data and then a pulse width modulation signal is generated, and FIG. 14-A is a timing chart showing the operation of each block in FIG. 14-B.
Figure 14:
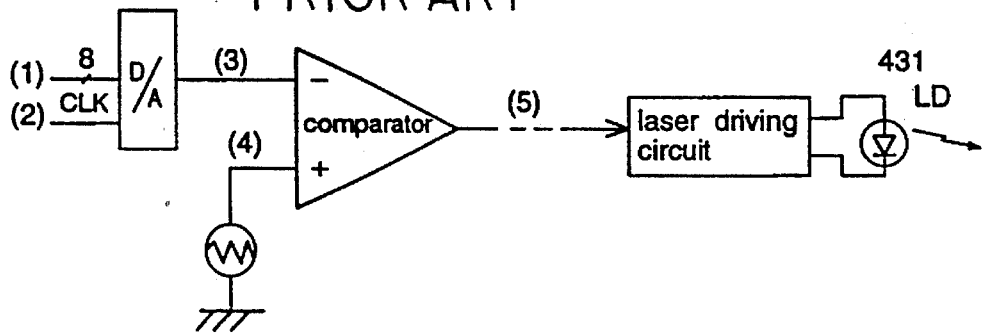

FIG. 13 is a schematic illustration showing the effects of the present method in an image which is recorded two-dimensionally, in which the recorded image obtained by the conventional method is expressed by a dotted line, and the recorded image obtained by the present method is expressed by slant line. In the drawing, (a) shows the standard processing by the present method, and (b) shows processing for increasing sharpness by the present method, by which processing for increasing the recording density of the edge portion of the image, as compared with (a), is conducted. (c) is an illustration in which processing for increasing gradation by the present method is conducted, and in the drawing, processing by which the density becomes higher in the low density portion and lower in the high density portion on the entire image, as compared with (a), is conducted.

Due to the aforementioned, the recorded position by pulse-width-modulation can be moved in one pixel, without using a high frequency circuit, by a comparatively simple structure, and further, image sharpness and gradation can be improved by enlarging the pulse width.

Incidentally, in the example, S0, and S1 are obtained by calculating the left and right pixel density data of 'the pixel to be recorded' in the arithmetic circuit 240, but the calculation may be the difference calculation between data of 'the pixel to be recorded' and the pixel data which has been recorded just before 'the pixel to be recorded', or that between data of 'the pixel to be recorded' and the pixel data which should be recorded just after the pixel to be recorded, and almost the same effects can be obtained by these two calculations.

Figure 7:
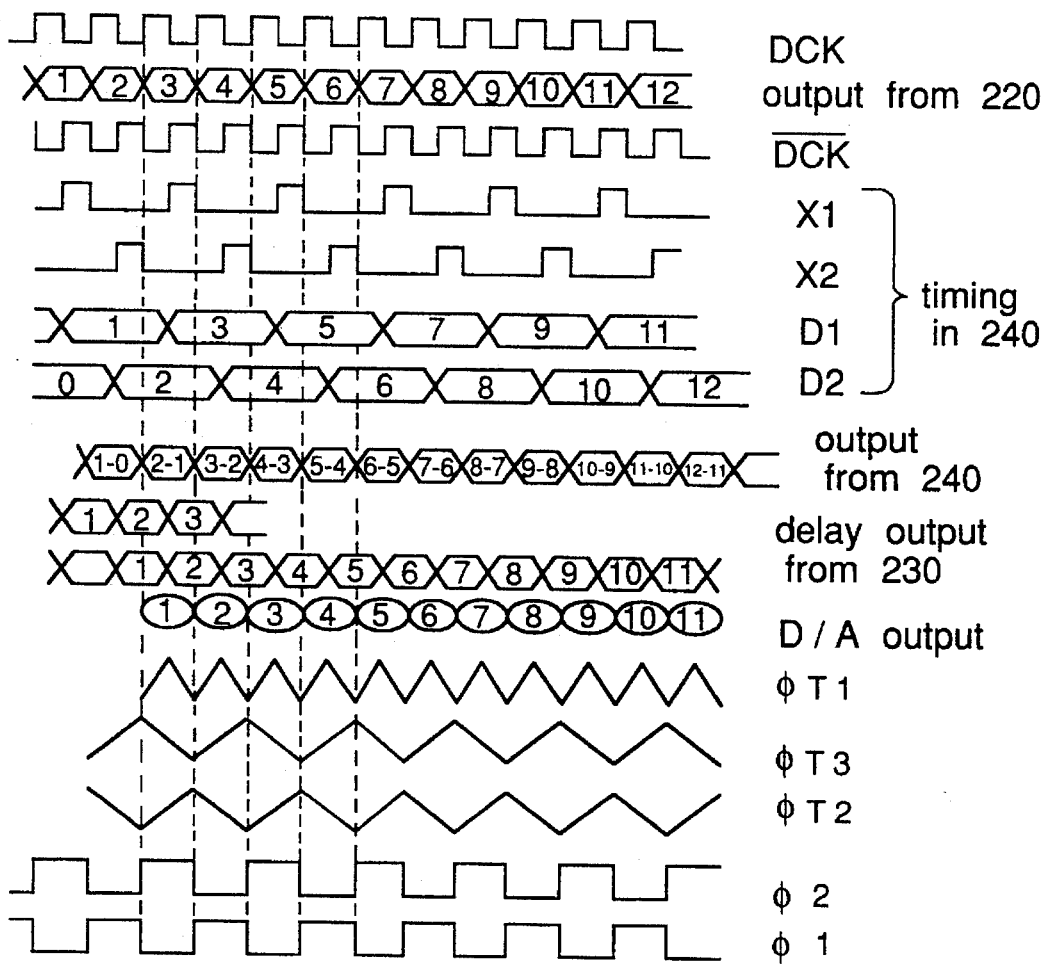
FIG. 7 is a timing chart in the case where calculation is conducted by density data of the image to be recorded and the next image.
Figure 8:
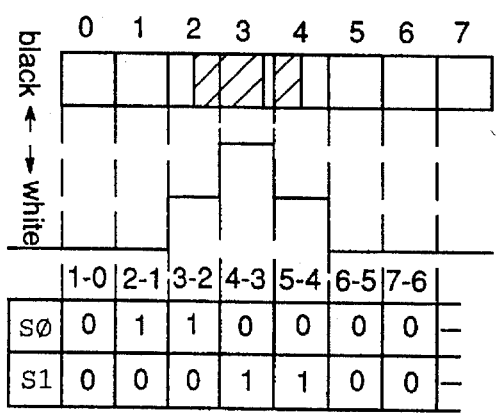
FIG. 8 is a pixel pattern obtained from the timing chart in FIG. 7.

FIG. 7 shows a timing chart in the case where the calculation is conducted between density data of the image to be recorded and that of the image which should be recorded just after the former, and an example of a pixel pattern to be recorded is shown in FIG. 8. From the drawing, it can be understood that the left and right pixels approach the high image density pixel and they are recorded almost the same as in FIG. 6(2).

Figure 15:
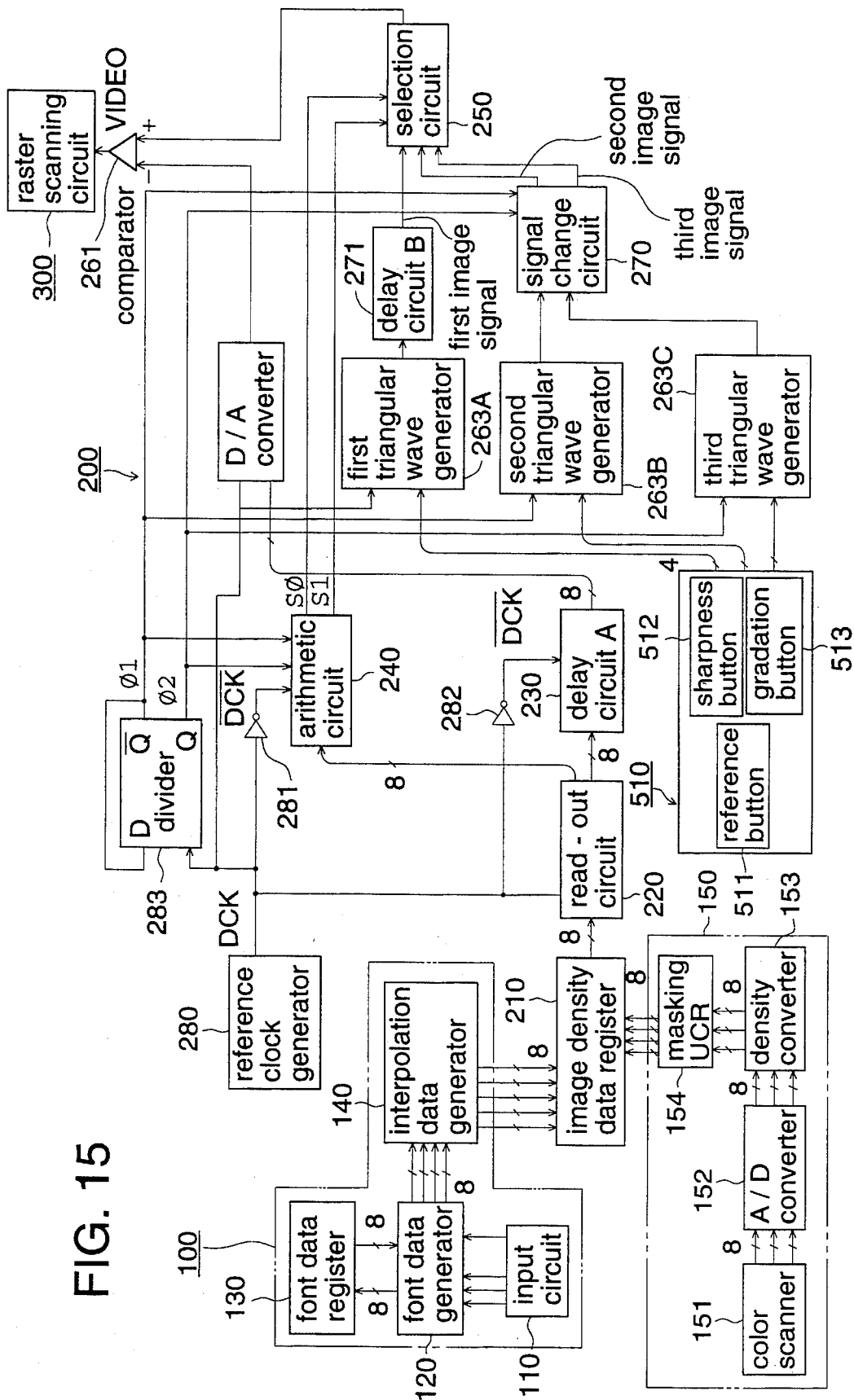
FIG. 15 is a block diagram showing an image processing circuit of another example to which the present invention is applied.

In the present invention, a specific pulse signal is selected after a pulse width modulated signal corresponding to the density has been obtained with respect to each reference wave, however, the following method may be conducted: after the specific reference wave has been selected previously as shown in FIG. 15, a pulse width modulated signal is obtained by comparing with an image density signal.

In the present embodiment, recording on a high γ photoreceptor is described, however, the same effect as the embodiment can be fully expected even when the high γ photoreceptor is not used.

An image forming method according to the present invention describe above in an image forming apparatus in which recording is conducted by a modulated signal in which an image density data is modulated by a reference wave signal. The image forming method is characterized in that: the apparatus has a plurality of reference waves; the image is formed when one of a plurality of modulated image signals obtained by comparing the image density data with a plurality of reference waves in a combination according to a calculated result of 'the image density data to be recorded' or the image density data around that, is selected; amplitude for modulation is generated by changing amplitude of the reference wave to be used or a D.C. component; the sharpness and gradation of the image which is generated from a scanner, C.G., font data, or the like, are improved by the image formation due to the aforementioned; and sharpness and gradation which can be adjusted from the outside of the apparatus according to the image, can be provided.

Next, a color image forming apparatus according to another embodiment of the present invention will be explained as follows. In the color image forming apparatus, an objective matrix pixel of the image density data is composed of small pixels m×n (width×length), and a distribution of the density data of adjoining pixels including the objective pixel, is replaced with the distribution of small pixels m×n in one pixel, and the image is formed by the following method: a position in which dots of n rows are written is displaced when a phase of a reference wave in each row of small pixels is displaced according to image density data of small pixels obtained by distributing data of the objective pixel multiplied by constant P corresponding to the distribution. Displacement of the position in which dots are written will be referred to as recording position modulation, hereinafter. Further, processing to convert the image density data of the objective pixel into the image density data of small pixels obtained by dividing the objective pixel into m×n, will be referred to as resolution enhancing processing (RE processing), hereinafter. Due to RE processing, high density recording can be conducted. In this case, a high γ photoreceptor is specifically effective in order to form a latent image corresponding exactly to the reference wave.

In this invention, RE processing is conducted when ① the image density data of the objective pixel is not less than a first threshold value, that is, not less than the specific density in which a recorded optical reflection density is 0.1, namely the first threshold value. In many portions of an area corresponding to a highlight portion, RE processing is not conducted on a background portion of a document, and small pixels m×n are set to have a uniform density. In the case of CRT, this data display can be possible.

However, in the case of laser recording which will be described later, it is difficult to display the data uniformly, and therefore, the reference wave whose density center exists in the center of the image density, is selected. Due to the aforementioned, uniformity in the highlight portion can be kept, and a noisy image can be prevented from occurring.

① In the case of high density and a steep density gradient, when a reference wave whose density recording position does not exist in the center is selected, dots are formed in the manner that they overlap with the adjoining pixel.

In order to prevent a density change and recording dot blocking between pixels, when the image density data of the objective pixel is not less than a specific second threshold value, and also in a high density portion in which a recorded optical reflection density is 0.5, a reference wave whose density center exists in the center of the image density, is selected. When either one of the conditions of threshold values ① and ② is used, it is effective for image formation.

Since a uniform display can be conducted in the case of CRT, the densities of small pixels m×n are processed as a uniform density. That is, RE processing is not conducted.

In a color image forming apparatus in which high density image recording is conducted according to density distribution data in the objective pixel which is determined corresponding to density data of the pixels adjoining the objective pixel, a color image forming apparatus which is characterized as follows is preferable: when a specific density data of the objective pixel is not less than the first threshold value in the low density portion, recording position modulation is conducted according to the determined density distribution; or when a specific density data of the pixel is not more than the second threshold value in the high density portion, recording position modulation is conducted according to the determined density distribution.

FIG. 21(a) is a plan view in which the adjoining pixels including the objective pixel m5 are expressed as m1 to m9 when the objective pixel is defined as m5, and the objective pixel m5 is divided into 3×3 small pixels. FIG. 21(b) is an enlarged view in which each small pixel is expressed by s1 to s9 when the objective pixel is divided into small pixels of 3×3. m1 to m9 and s1 to s9 also express the density of each portion.

RE processing will be explained in detail as follows. Taking the example of the case where the objective pixel m5 is divided into 3×3 small pixels, density of a small pixel si is determined by the following equation.

$$si = (9 \times m5 \times P \times mi/A) + (1-P) \times m5$$

Where i=1, 2, ..., 9, and P is a constant, which is called strength for RE processing, and in which the range of 0.1 to 0.9 is used, and A is the sum total of m1 to m9.

In the above equation, a term of (9×m5×P×mi/A) expresses a density in which the density of the objective pixel m5 multiplied by P is distributed to each small pixel according to density ratio of the adjoining pixels, and the term (1−P)×m5 expresses a density in which the residual density of the objective pixel m5 is distributed equally to each small pixel, so that an element of unsharpness is taken into the equation.

Figure 22:
FIGS. 22(a) and 22(b) are views showing an example in the case where an objective pixel for RE processing is divided into 3×3, and P= 0.5.

FIG. 22 is an illustration showing an example in which the objective pixel m5 is divided into 3×3 small pixels, and P=0.5. FIG. 22(a) is an illustration showing an example of the density distribution of the adjoining pixels including the objective pixel m5. FIG. 22(b) is an illustration showing the density distribution in the objective pixel m5 which is calculated by P=0.5.

Figure 10:
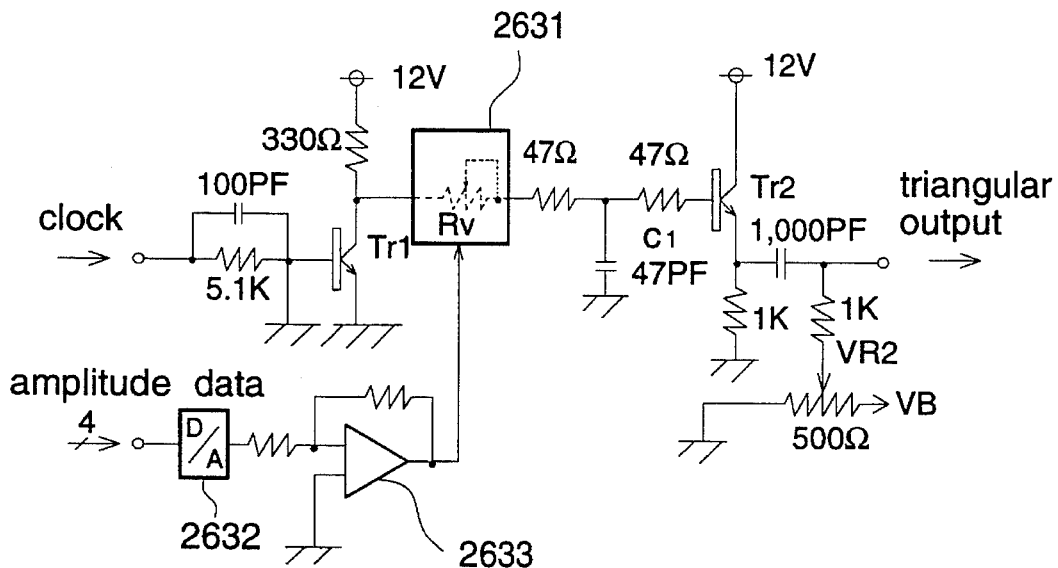
FIGS. 10(a) and 10(c) are views showing a triangular wave generator.
FIG. 10(b) is the output of the triangular wave generator of FIGS. 10(a) and 10(c).
Figure 10:
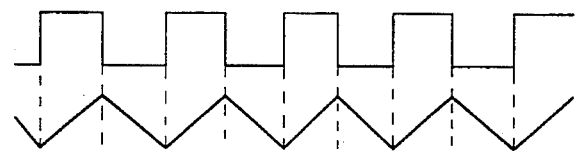
Figure 10:
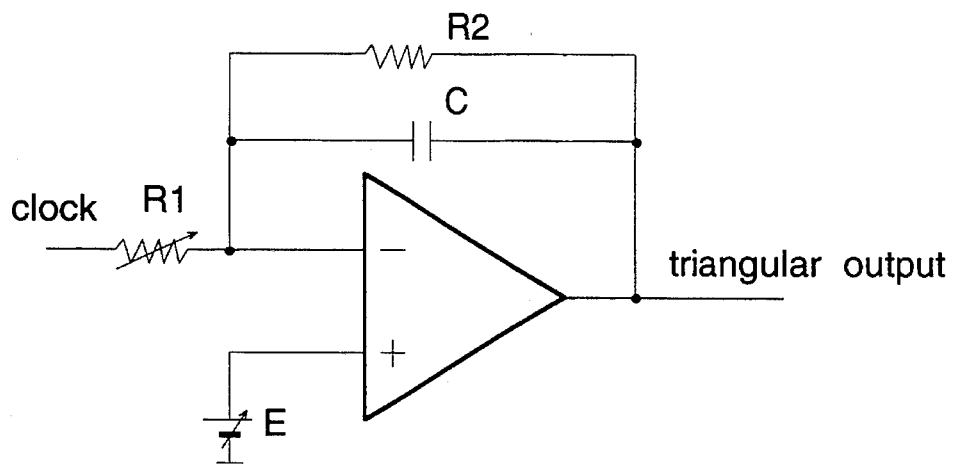
Figure 23:
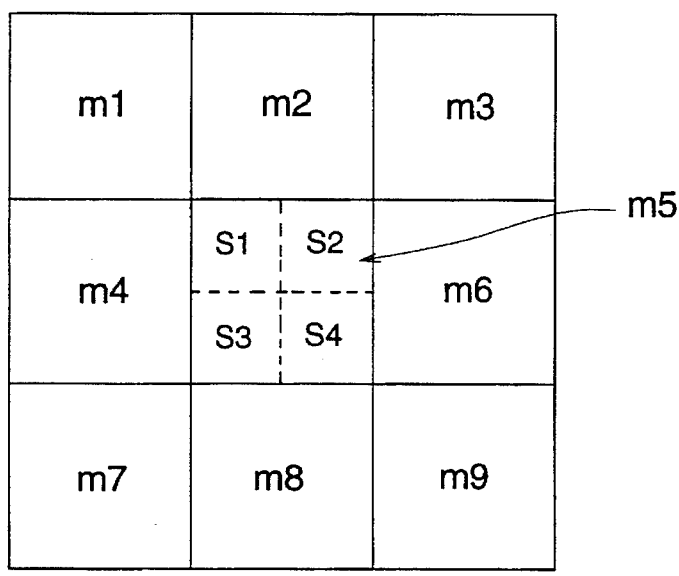
FIGS. 23(a) and 23(b) are views showing an example in the case where the objective pixel is divided into 2×2.
Figure 23:
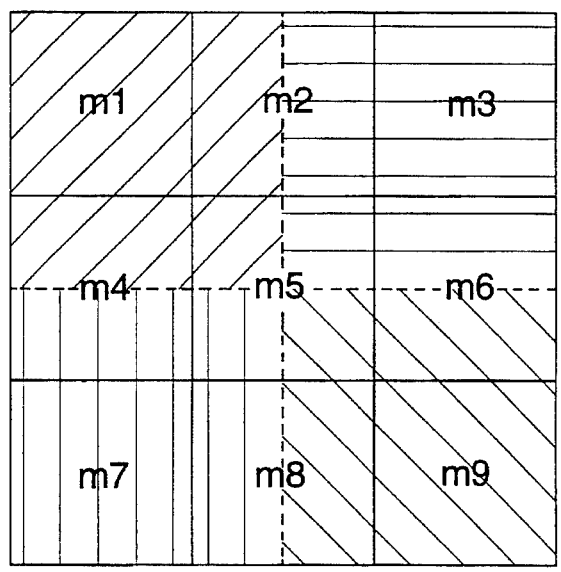

FIG. 9 and FIG. 10 show an example in which the objective pixel m5 is divided into 2×2 small pixels. FIG. 23(a) is an illustration showing an example in which the objective pixel m5 is divided into 2×2 small pixels. FIG. 23(b) is an illustration showing an example of the adjoining pixels relating to small pixels s1 to s4 in the objective pixel. Density of s1, s2, s3, and s4 is calculated according to Equation 1.

$$s1 = \frac{4m1 + 2(m2 + m4) + m5}{A} \times m5 \times P + (1-P) \times m5 \quad \text{(Equation 1)}$$

$$s2 = \frac{4m3 + 2(m2 + m6) + m5}{A} \times m5 \times P + (1-P) \times m5$$

$$s3 = \frac{4m7 + 2(m4 + m8) + m5}{A} \times m5 \times P + (1-P) \times m5$$

$$s4 = \frac{4m9 + 2(m6 + m8) + m5}{A} \times m5 \times P + (1-P) \times m5$$

where A is the total sum of m1 to m9.

Figure 24:
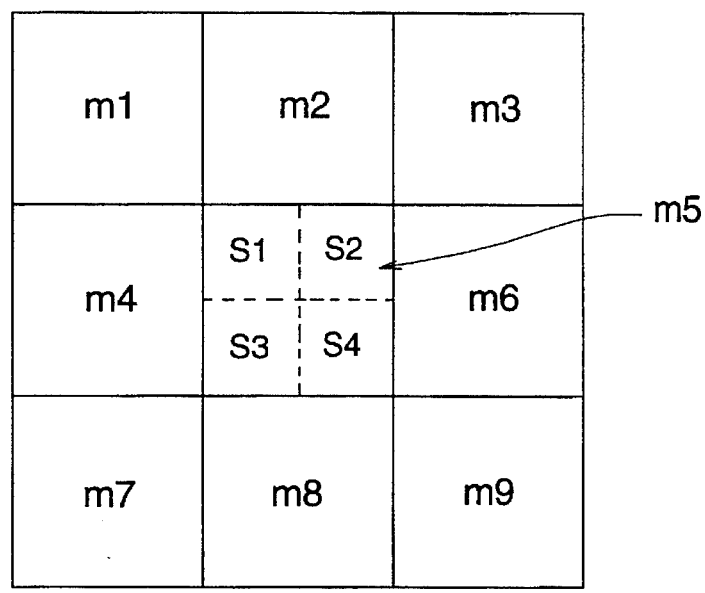
FIGS. 24(a) and 24(b) are views showing another example in the case where the objective pixel for RE processing is divided into 2×2.
Figure 24:
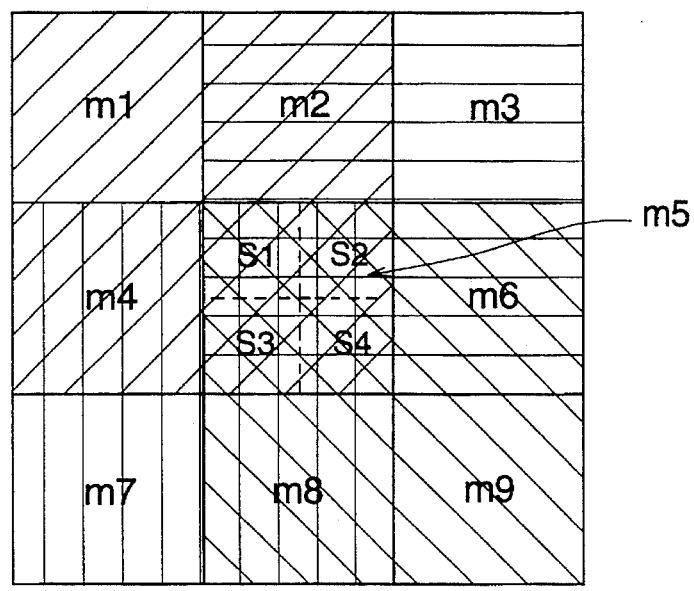

FIG. 24(a) is an illustration showing another example in which the objective pixel m5 is divided into 2×2 small pixels. FIG. 24(b) is an illustration showing another example of the adjoining pixels relating to small pixels s1 to s4 in the objective pixel. Density calculation of s1, s2, s3, and s4 is conducted according to Equation 2.

$$s1 = \frac{m1 + m2 + m4 + m5}{A} \times \frac{9}{4} \times m5 \times P + (1-P) \times m5 \quad \text{(Equation 2)}$$

$$s2 = \frac{m2 + m3 + m4 + m5}{A} \times \frac{9}{4} \times m5 \times P + (1-P) \times m5$$

$$s3 = \frac{m4 + m5 + m7 + m8}{A} \times \frac{9}{4} \times m5 \times P + (1-P) \times m5$$

$$s4 = \frac{m5 + m6 + m8 + m9}{A} \times \frac{9}{4} \times m5 \times P + (1-P) \times m5$$

where A is the total sum of m1 to m9.

Figure 16:
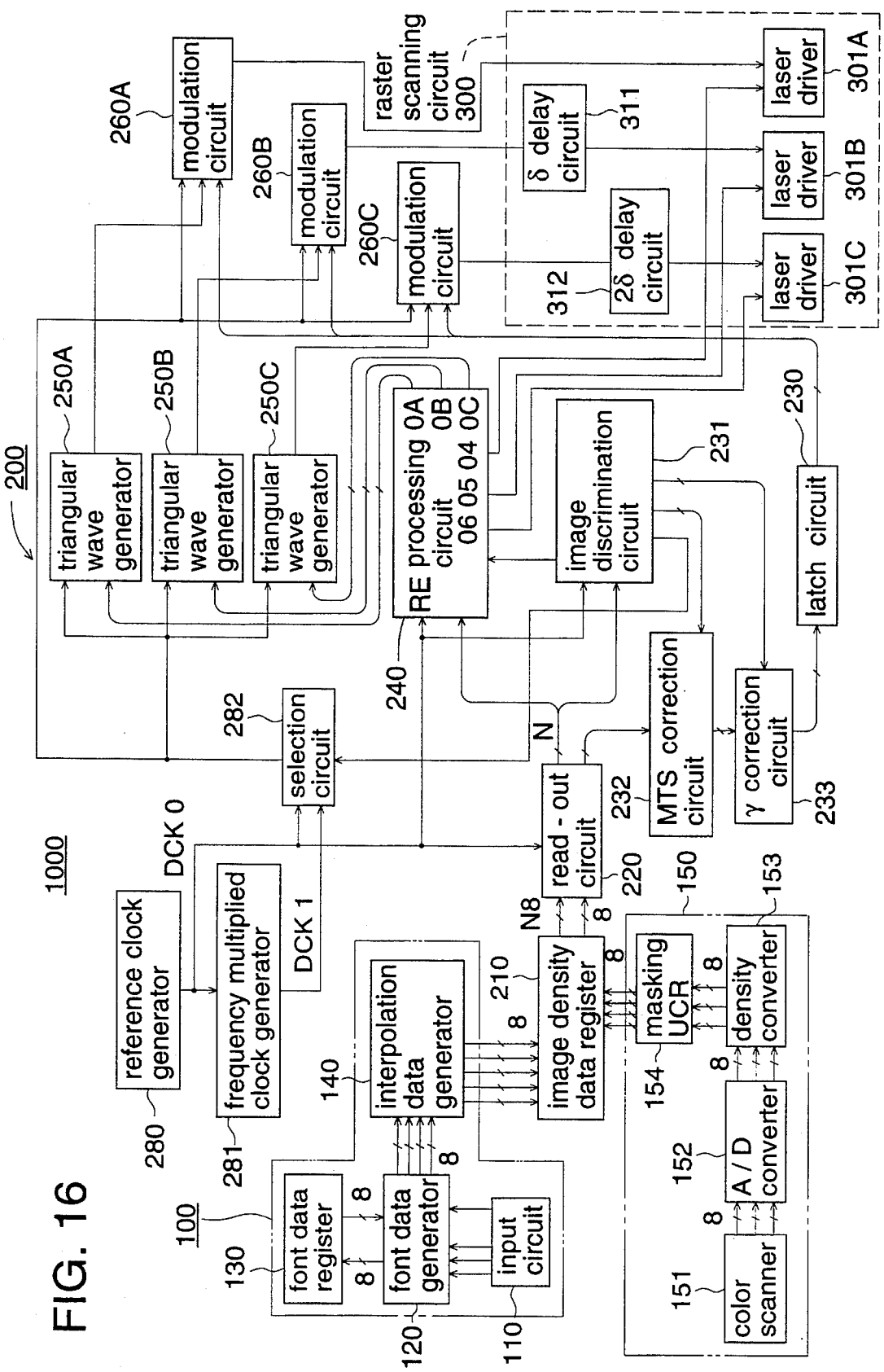
FIG. 16 is a block diagram of an image processing circuit of another example of the image forming apparatus of the present invention.
Figure 17:
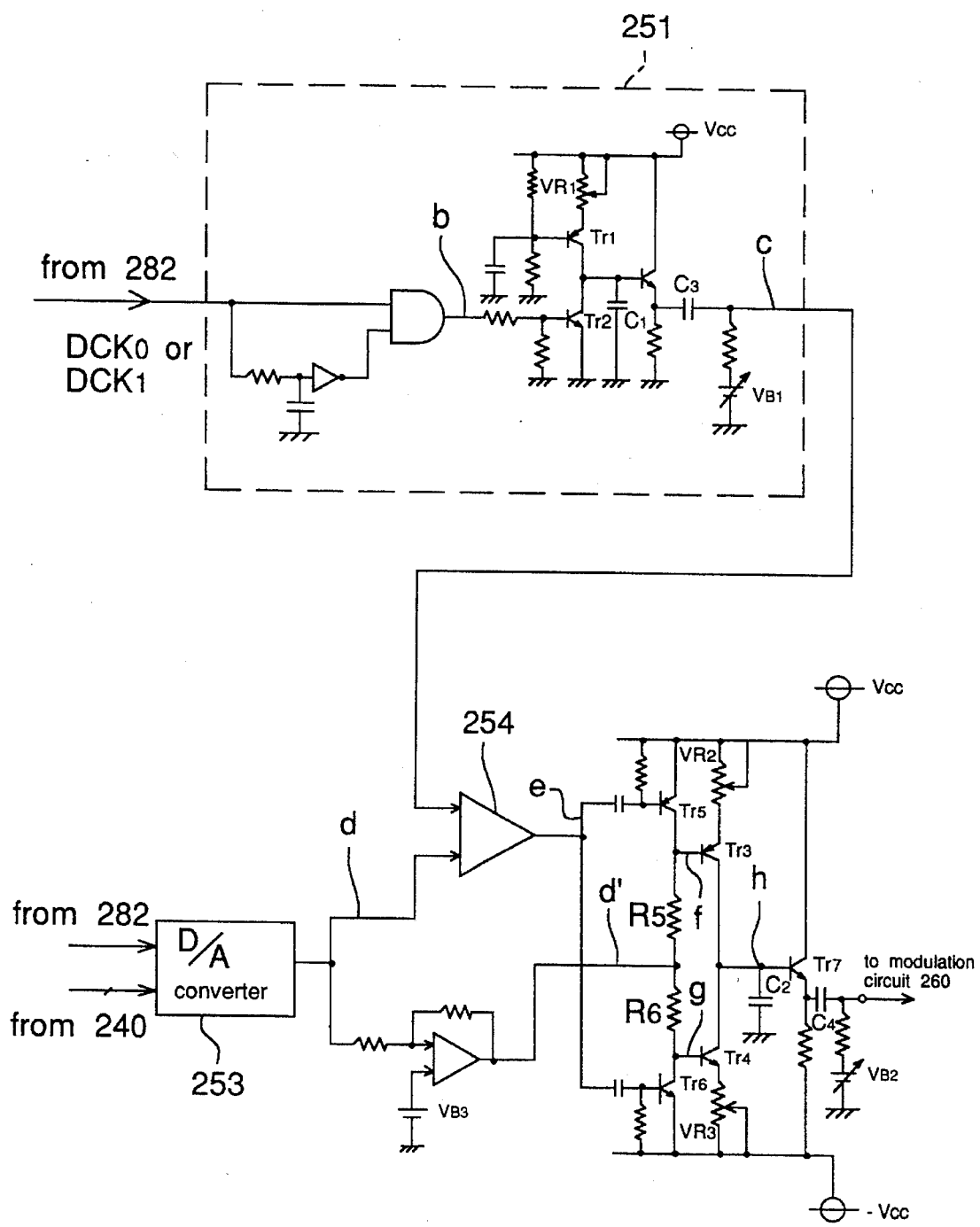
FIG. 17 is a circuit diagram showing an example of a triangular wave generation circuit shown in FIG. 16.
Figure 19:
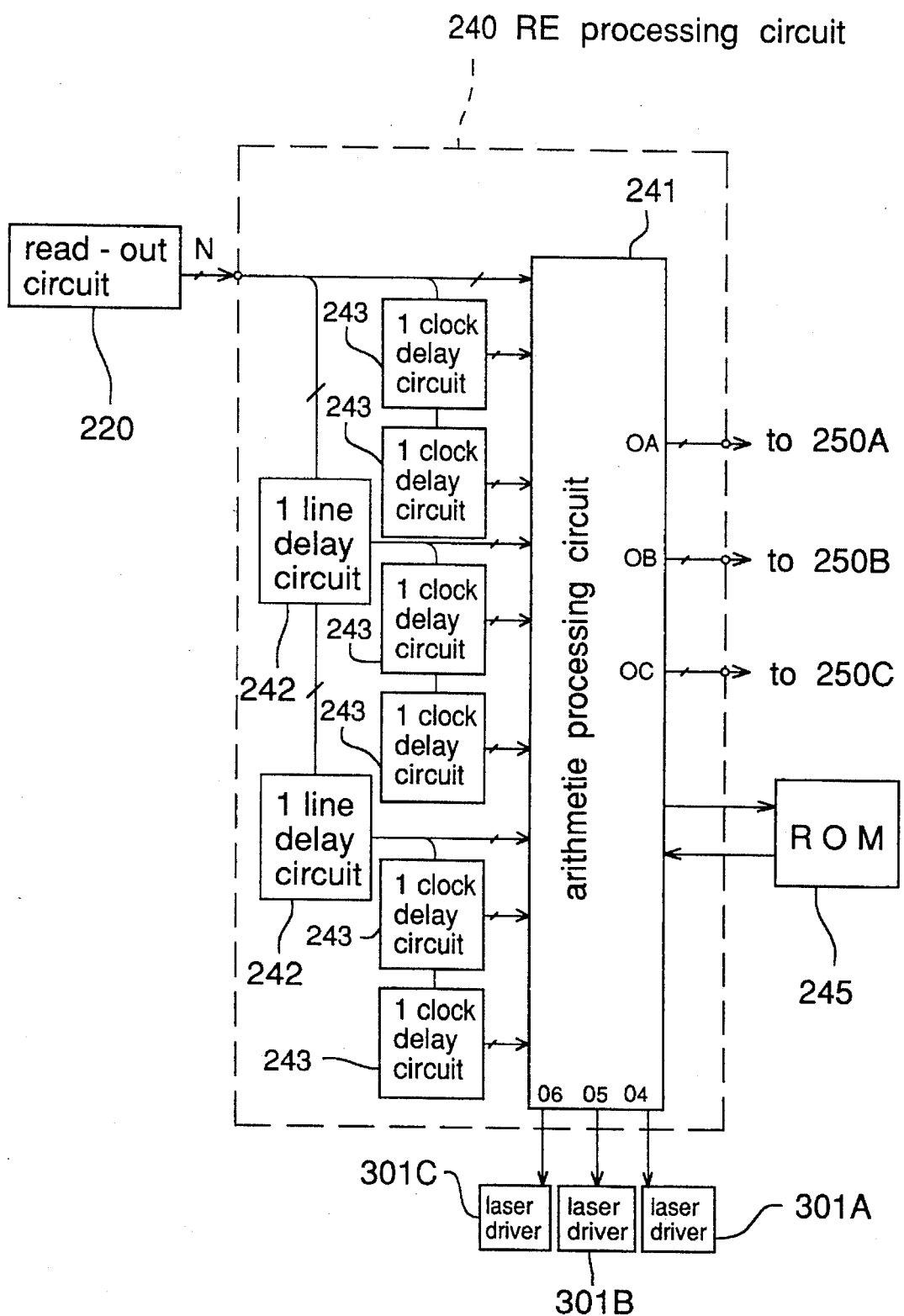
FIG. 19 is a block diagram showing an example of the RE (Resolution Enhancing) processing circuit in FIG. 16.
Figure 20:
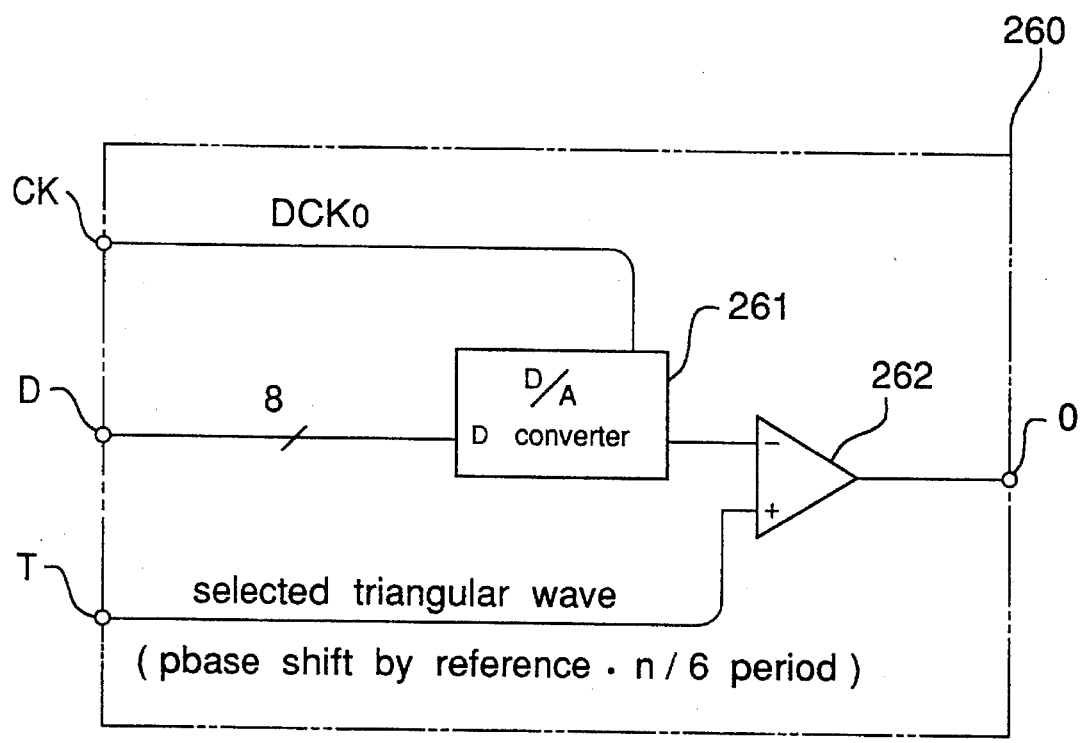
FIG. 20 is a block diagram showing an example of the modulation circuit in FIG. 16.

FIG. 16 is a block diagram showing an example of an image processing circuit which is used in a color image forming apparatus of the present invention (an example in which the objective pixel is divided into 3×3). FIG. 17 is a circuit diagram showing an example of a triangular wave generator in FIG. 16. FIG. 19 is a block diagram showing an RE processing circuit in FIG. 16, and FIG. 20 is a block diagram showing a modulation circuit in FIG. 16.

Image processing circuit 1000 of the present embodiment is a circuit which structures a driving circuit of an optical scanning system, and is composed of an image data processing circuit 100, a modulation signal generator circuit 200 and a raster scanning circuit 300.

The image data processing circuit 100 is a circuit which interpolates an edge portion of font data and is outputs it, and composed of an input circuit 110 including a computer, a font data generator circuit 120, a font data memory circuit 130, and an interpolation data generator circuit 140. The circuit 100 sends a character code signal from the input circuit 110, a size code signal, a position code signal and a color code signal to a font data generator circuit 120. The font data generator circuit 120 selects an address signal from four kinds of input signals and sends it to the font data memory circuit 130. The font data memory circuit 130 sends an outline font data corresponding to one character which corresponds to an address signal to the font data generator circuit 120. The font data generator circuit 120 sends the outline font data to the interpolation data generator circuit 140. The interpolation data generator circuit 140 interpolates notches or jumping of the image density data, which is generated at the edge portion of the outline font data in conventional binary development, and sends it to an image density data memory circuit 210 which is composed of a frame memory in 8 bit image data by using intermediate density. Concerning the generated color, corresponding colors are converted into density data of yellow (Y), magenta (M), cyan (C), and black (B) corresponding to a color code. Before the data is sent to the image density data memory circuit 210, each density data may be sent again after data has been processed by masking, and UCR. Due to the aforementioned, a font is bit-map-developed in each frame memory under the condition that each color has the same shape and the ratio of density is different.

The modulation signal generator 200 is structured by the image density data memory circuit 210, a read-out circuit 220, a latch circuit 230, an image discrimination circuit 231, an MTF correction circuit 232, a γ correction circuit 233, an RE processing circuit 240, triangular wave generators 250A to 250C which are means to generate reference waves, modulation circuits 260A to 260C, a standard clock generator 280, a frequency multiplied clock generator 281, a selector circuit 282, and the like.

The image density data memory circuit 210 is an ordinary page memory (hereinafter, it will be referred to as a page memory), and a RAM (random access memory) which stores data by every one page, and has a capacity which can store multi-value image density data corresponding to at least one page (1 image frame). When it is accepted for a color printer, the printer is provided with a page memory which can store an image density signal corresponding to each color component of a plurality of colors, for example, yellow, magenta, cyan, and black.

The read-out circuit 220 reads out continuous image density data of every one scanning line, which is continued in synchronization with the standard clock $DCK_0$, from the image density data memory circuit (page memory) 210, and sends it to the RE processing circuit, the image discrimination circuit 231, and MTF correction circuit 232, wherein an index signal which determines the front timing of the raster scanning is used as a trigger.

The latch circuit 230 is a circuit which latches the image density data while processing in RE processing circuit (which will be explained later) and triangular wave generators 250A to 250C are conducted.

The standard clock generator 280 is a pulse generating circuit, and generates the standard clock $DCK_0$ which is a pulse signal with a cycle period the same as the pixel clock, and sends it to the read-out circuit 220, the frequency multiplied clock generator 281, and the selector circuit 282.

The frequency multiplied clock generator 281 generates a frequency multiplied clock $DCK_1$ having a frequency which is two times as high as that of the pixel clock and sends it to the selector circuit 282, according to the reference clock $DCK_0$.

The selector circuit 282 selects one of the reference clock $DCK_0$ and the frequency multiplied clock $DCK_1$, inputted from the frequency multiplied circuit 281, by a selection signal from the image discrimination circuit 231 which will be described later, and outputs it to the triangular wave generators 250A to 250C, the modulation circuits 260A to 260C, and the like.

The triangular wave generators 250A to 250C are structured by the same circuit as shown in FIG. 17, and with a saw-tooth-wave from the saw-tooth-wave generator 251, and position data of gravity center of each primary scanning line sent from the RE processing circuit 240, the generators 250A to 250C generate the reference waves which are composed of triangular waves having different top positions corresponding to their position data of gravity center, and send them to the modulation circuits 260A to 260C.

Figure 18:
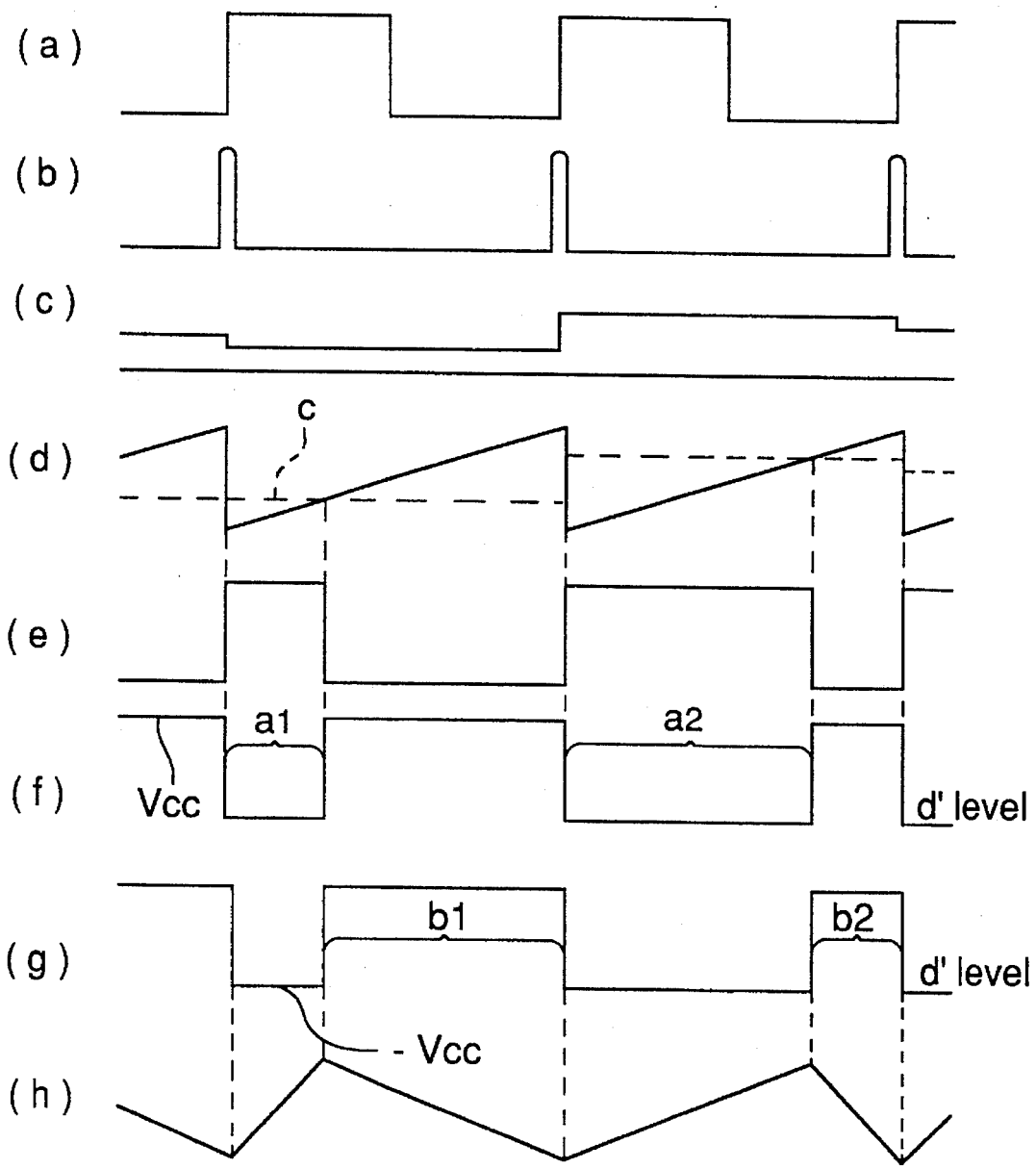
FIG. 18 is a time chart showing a signal wave of each portion in the triangular wave generation circuit shown in FIG. 17.

FIG. 18 is a timing chart showing signal wave forms at each portion of the triangular wave generators 250A to 250C shown in FIG. 17. Operations of the triangular wave generator 250 will be explained as follows according to the timing chart.

In FIG. 18, (a) shows a wave form of the clock signal at point a, and (b) shows a detection signal in which a rising portion of the clock signal is detected by a rising edge detection circuit at point b. Tr2 is turned on for a short period of time by the detected signal, C1 is discharged once, and after that, charging is started through Tr1, and a saw-tooth-wave shown in (c) is generated at point c. VR1 shown in the drawing is a variable resistor to adjust a charging current, and VB1 is a D.C. variable power source to adjust a D.C. level of the generated saw-tooth-wave. (d) shows a wave form in which 8 bit position data of gravity center obtained from the RE processing circuit 240 is converted into an analog signal by a D/A converter installed in a circuit 251, and (e) is an output signal in which the analog signal and the saw-tooth-wave which is inputted from a saw-tooth-wave generator installed in the circuit 251, are compared by a comparator 252. The output signal is inputted into bases of Tr4 and Tr5 through a capacitor and turns them on. The analog signal of the position data of gravity center is inputted into a central point among Tr5, R5, R6, and Tr6 which are connected in series between power source Vcc and –Vcc after the D.C level of the analog signal has been adjusted by VB3. Due to the aforementioned, signal wave forms of point f and point g are shown respectively by (f), and (g). Levels shown by a1 and a2 in (f) determine a magnitude of a charging current of a capacitor C2, and levels shown by b1 and b2 in (g) determine the magnitude of a discharging current of the capacitor C2. Therefore, a triangular wave in which a top position, shown in (h) is determined corresponding to the position data of gravity center, is obtained in point h in FIG. 17.

Figure 29:
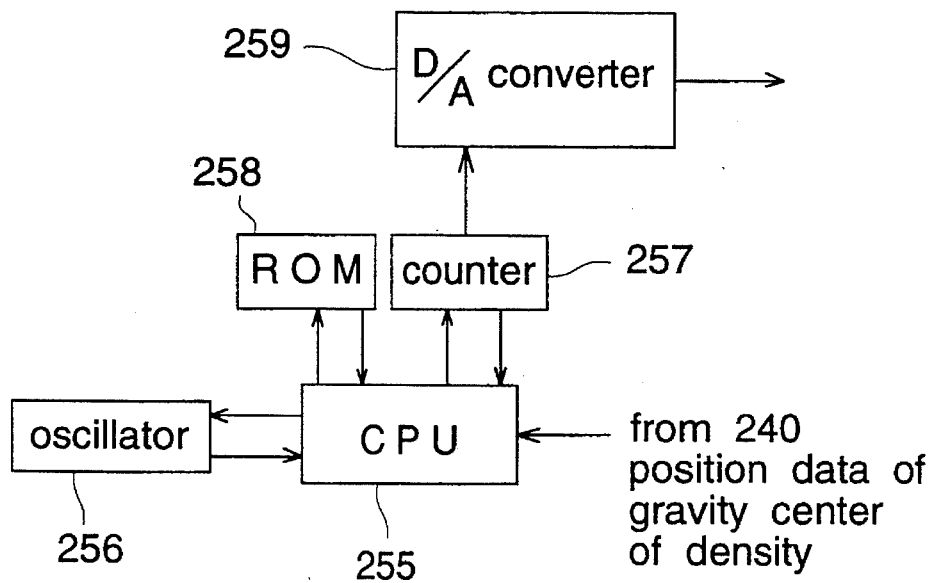
FIG. 29(a) is a block diagram showing another example of the triangular wave generating circuit.
FIG. 29(b) is an output diagram of the circuit of FIG. 29(a).
Figure 29:
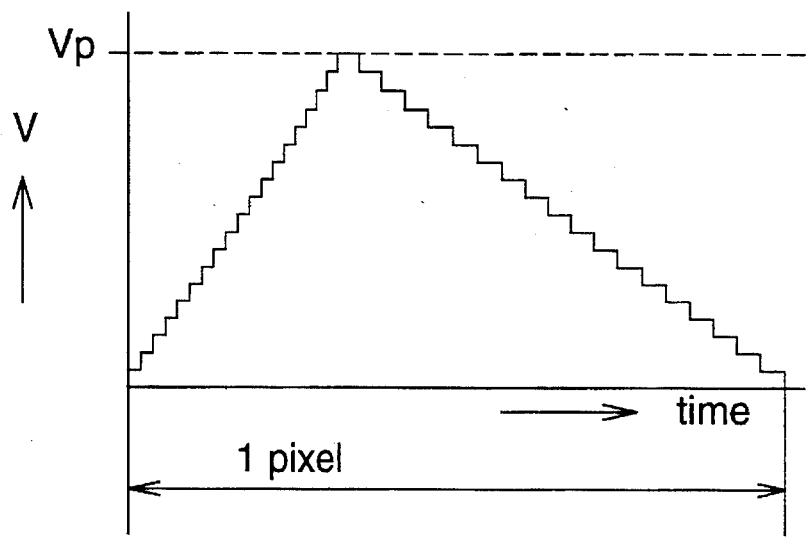

A triangular wave, which displaces its top position corresponding to the position of gravity enter of density, can be generated also by a circuit shown in FIG. 29(a). That is, a CPU 255 selects a rising clock pulse for reference wave generation from a table of a ROM 258 according to 8 bit position data of gravity center inputted from the RE processing circuit 240. Due to this, when a counter 257 counts the number of pulses inputted from an oscillator 256 and the number of pulses reaches a predetermined number (when voltage of the reference wave becomes equal to a predetermined voltage Vp), the counter 257 is counted down. Next, the CPU selects a falling clock pulse of the reference wave which is determined by the position data of gravity center from a table of the ROM258, and the counter is counted down by the clock. As a result, a wave form shown in FIG. 29(b) is obtained, and converted into an analog signal by a D/A converter 259. Due to the aforementioned, a triangular wave whose cycle frequency is the same as that of the pixel clock, and in which the top position corresponding to the position data of gravity center is displaced, can be obtained.

The modulation circuits 260A to 260C are structured by the same circuit as shown in FIG. 20, and composed of a D/A converter 261, a comparator 262, and an input section T of the triangular wave corresponding to the position data of gravity center. The modulation circuit D/A converts the image density data inputted through the latch circuit 230, by the D/A converter 261 in synchronization with the clock $DCK_0$ or $DCK_1$, and the triangular waves inputted from the triangular wave generators 250A to 250C are compared as reference waves so that the pulse width modulation signal can be obtained.

The image discrimination circuit 231 discriminates that the inputted image density data exists in a character region or a halftone region, and outputs a selection signal, which selects the standard clock $DCK_0$ with respect to the character region, or the frequency multiplied clock $DCK_1$ with respect to the halftone region, to the selector circuit 282. Further the circuit 231 sends a signal which makes an MTF correction circuit 232 and a γ correction circuit 233 operate or not operate, to these circuits, as will be described later.

As shown in FIG. 19, the RE processing circuit 240 is composed of a one line delay circuit 242, a one clock delay circuit 243, and an arithmetic processing circuit 241. The one line delay circuit operates as follows: the image density data of the first one scanning line of three scanning lines of the image density data in which one scanning line is sent at a time, is delayed for two line scanning times by the one line delay circuit 242: the image density data of the second scanning line is delayed for one line scanning time by the circuit 242; and the image density data of the last one scanning line is not delayed. Further, each image density data is delayed for the time of two standard clocks or one standard clock by the one clock delay circuit 243, and all image density data of the pixels, which include the objective pixel and adjoining pixels, are sent at the same time to the arithmetic processing circuit 241. In FIG. 19, a standard clock $DCK_0$ input is neglected.

In the arithmetic processing circuit 241, the image density data of the small pixel is obtained by the RE processing. At first, the density distribution in one pixel is obtained by the following method.

The image density data of the obtained small pixel is divided into a small scanning line including s1, s2, s3 . . . , the small scanning line including s4, s5, s6 . . . , and the small scanning line including s7, s8, s9 . . . , and one scanning line of the original pixel corresponds to these three scanning lines of the small pixels.

Figure 25:
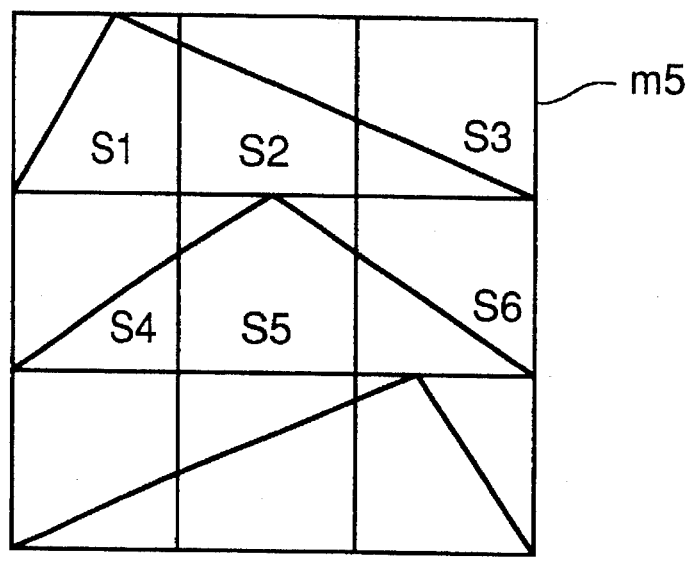
FIG. 25 is a view showing a shape of the reference wave in the case where the image signal exists in the character region.

The arithmetic processing circuit 241 calculates average density of each small scanning line and the position of gravity center of the density data in each small scanning line, outputs an analog signal of the average density data to laser drivers 301A to 301C from output terminals O4, O5, and O6, and outputs the position data of gravity center to triangular wave generators 250A to 250C from the output terminals OA to OC. That is, the arithmetic processing circuit 241 outputs the following position data of gravity center corresponding to the positions of gravity center of density from the output terminal OA to triangular wave generator 250A: the maximum digital signal when the gravity center of density of s1, s2, and s3 of the pixel m5 (the first small scanning line) is positioned at a left end of s1; a digital signal of an intermediate value when the gravity center of density is positioned at the center of s2; and the minimum digital signal when the gravity center of density is positioned at a right end of s3. In the same manner, from the output terminal OB, the position data of gravity center of the second small scanning line which is determined by the position of gravity center of density of s4, s5, and s6 of the pixel m5 (in this case, a central small scanning line) is outputted to the triangular wave generator 250B, and from the output terminal OC, the position data of gravity center of the third small scanning line which is determined by the position of gravity center of density of s7, s8, and s9 of the pixel m5, is outputted to the triangular wave generator 250C. FIG. 25 is an illustration showing an example of the relation between the triangular waves whose top positions are different and the objective pixel.

Figure 32:
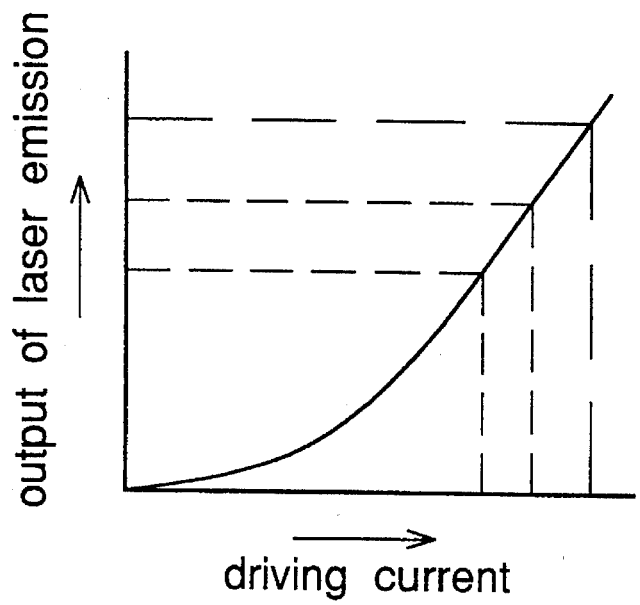
FIG. 32 is a graph showing the relation between a driving current and an output of emission of the semiconductor laser.

The arithmetic processing circuit 241 controls an emission output of laser drivers 301A to 301C corresponding to the average density in the pixel m5 of each small scanning line. For example, the circuit 241 controls a semiconductor laser 301A to emit the beam in proportion to the average density of s1, s2 and s3. FIG. 32 is a graph showing an example of the relation between a driving current of the semiconductor laser and the output of laser emission.

Next, the case where a density distribution in two pixels, which is necessary when the image exists in a halftone region, is found will be explained as follows. The density data of the obtained small pixel is divided into a small scanning line including s1, s2, s3 . . . , the small scanning line including s4, s5, and s6, and the small scanning line including s7, s8, and s9, in m5 and m6 in FIG. 21, and three small scanning lines of the small pixels correspond to one scanning line in every two pixels of the original pixel.

Figure 27:
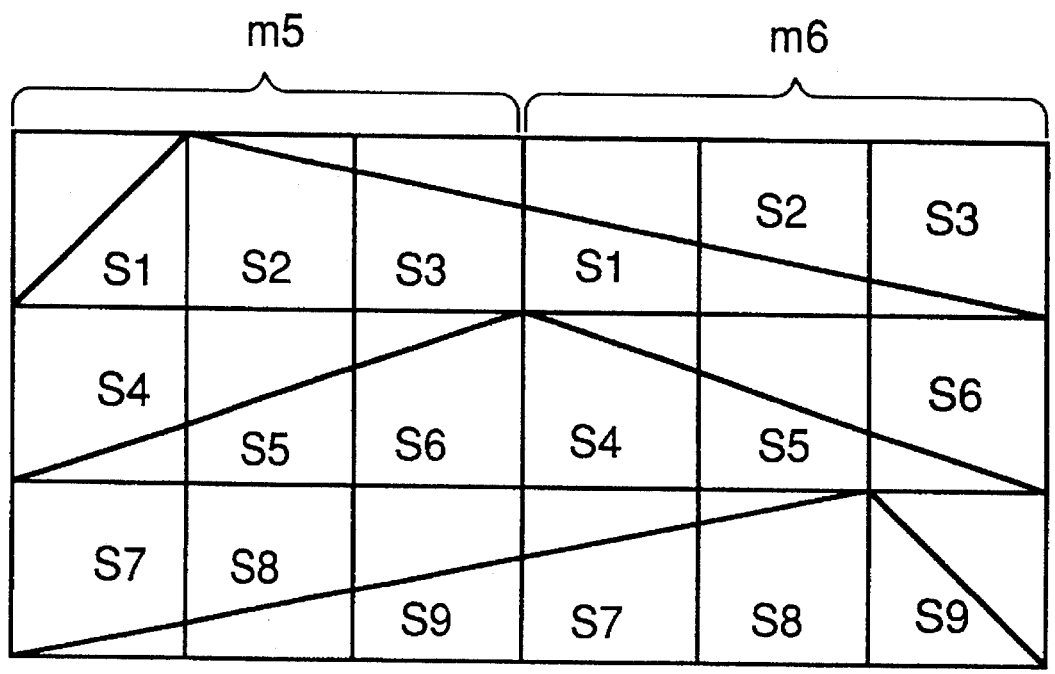
FIG. 27 is a view showing a shape of the reference wave in the case where the image signal exists in a halftone region.

When a signal which exists in the halftone region is inputted from the image discrimination circuit 231 into the arithmetic processing circuit 241, the position of gravity center of density including two pixels of each small scanning line and the average density in the original one pixel of each small scanning line are calculated in the circuit 241, and the circuit 241 outputs an analog signal of the average density data to laser drivers 301A to 301C from output terminals O4, O5, and O6, and the position data of gravity center to triangular wave generators 250A to 250C from the output terminals OA to OC. Namely, the arithmetic processing circuit 241 outputs the following position data of gravity center to the triangular wave generator 250A from the output terminal OA: the maximum digital signal when the gravity center of density of s1, s2, and s3 of the pixel m6 adjoining the pixel m5 (the first small scanning line) is located at a left end of s1 of m5; the digital signal with an intermediate value when the gravity center is located on a boundary point between s3 of m5 and s1 of m6; and the digital signal having the minimum value when the gravity center is located at a right end of s3 of m6. In the same manner, from the output terminal OB, the position data of gravity center of the second small scanning line which is determined by the position of gravity center of density of s4, s5, and s6 of the pixels m5 and m6 is outputted to the triangular wave generator 250B, and from the output terminal OC, the position data of gravity center of the third small scanning line which is determined by the position of gravity center of density of s7, s8, and s9 of the pixels m5 and m6, is outputted to the triangular wave generator 250C. FIG. 27 is an illustration showing an example of the relation between the triangular waves whose top positions are different, and the objective pixel.

As described above, the arithmetic processing circuit 241 outputs an analog signal corresponding to the average density in pixels m5 and m6 of each small scanning line to laser drivers 301A to 301C, and controls their emission outputs. For example, the circuit 241 controls the semiconductor laser 301A to emit the laser beam in proportion to the average density of s1, s2, and s3 between each pixel. FIG. 32 is a graph showing an example of the relation between a driving current of a semiconductor laser and an output of the laser emission.

The image discrimination circuit 231 compares the image data of the objective pixel with a predetermined first low threshold value, and with a predetermined second high threshold value. After that, when the image data of the objective pixel is discriminated to be out of the region of the first and second threshold values, the circuit 231 sends out, to the RE processing circuit 240, a signal which let the position data of gravity center in which the top position is positioned at the center with respect to all color components, send to triangular wave generators 250A to 250C, and does not operate the MTF correction circuit 232. Due to the aforementioned, the image density data which is read out from the read-out circuit 220 is not corrected by the MTF correction circuit 232, and after it has been corrected by the $\gamma$ correction circuit 233, it is sent to modulation circuits 260A to 260C through the latch circuit 230.

Due to the aforementioned, in the highlight and high density regions, MTF correction and position modulation are not conducted, and thereby an image which has high uniformity and no noise can be formed.

The image discrimination circuit 231 further discriminates generally, under the aforementioned conditions, which of the character region and halftone region the image belongs to. The discrimination is conducted by the density change in 16×16 pixels including the objective pixel. When the density change of the region is large, the discrimination circuit discriminates that the objective pixel belongs to the character region, and when the density change of the region is small, the circuit 231 discriminates that the objective pixel belongs to the halftone region. Further, when the result of the discriminated region is different only in a minute region, for example, when the halftone region exists, being isolated, in the character region, the halftone region is discriminated as the character region. In the case of the halftone region, the image is discriminated in the same manner. When the character and line are discriminated to belong to the character region, the discrimination circuit 231 outputs a selection signal which outputs standard clock $DCK_0$ to the selector circuit 282 so that a period of the reference wave can be the same as that of an image clock, and does not operate the MTF correction circuit 232 and the $\gamma$ correction circuit 233, and sends out the image density data, while it is not processed, through the latch circuit 230 to modulation circuits 260A to 260C. Due to the aforementioned, a sharp character or edge portion whose color is not changed, can be reproduced. Further, when the circuit 231 discriminates that the image belongs to the halftone region, the circuit 231 outputs a selection signal which outputs the frequency multiplied clock $DCK_1$ to the selector circuit 282 so that a period of the reference wave can be twice that of the image clock.

Due to the aforementioned processing, a high gradation image can be formed in the halftone region, and also an effect by which a character image is given sharpness and neatness.

A density data in which a specific color, for example, is converted into the density data of R+2G+B, (in this case, R is a density data of red, G is that of green, and B is that of blue), is used as the image density data used for determination of the top position of the reference wave. For convenience sake, the density data of (R+2G+B) will be expressed by N, hereinafter.

When the top position of the reference wave is used in common with respect to each recording color, gradation of an image can be assured, and color change can be prevented. For determination of the top position of the reference wave, a G component which visually coincides with the image density data, or achromatic data having the G component is preferably used. For the same reason, the data which is used for the image discrimination circuit 231 is data which is common with each color.

The modulation circuits 260A to 260C operate in the following manner: the signal of the image density data inputted through the latch circuit 230 by the triangular wave in which the top position is changed corresponding to the position of gravity center of density, is modulated; after that, the modulation signal which is pulse width modulated by the circuit, is generated; and the circuit sends out the modulation signal to the raster scanning circuit 300 after three small scanning lines (one scanning line in the case of the original image density data) in which these modulated signals are continued in parallel, are made to be one unit.

Next, operation of the modulation signal generator 200 will be explained as follows.

Figure 26:
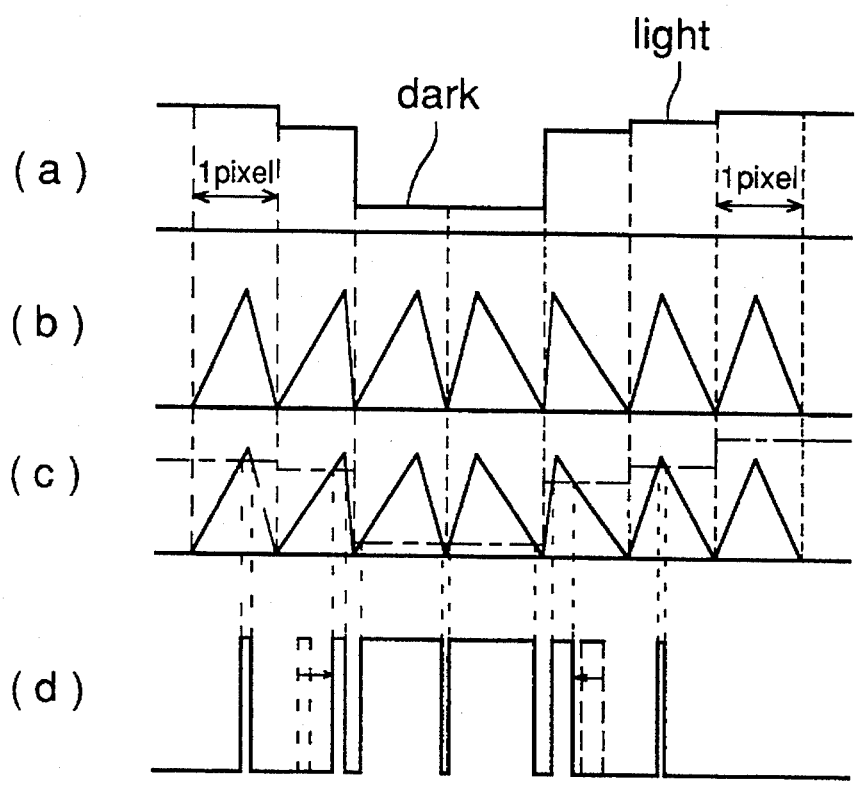
FIG. 26 is a timing chart showing each signal of a modulation signal generating circuit of the example in FIG. 16 in the case where the image signal exists in the character region.

FIGS. 26(*a*) to (*d*) are time charts showing a signal in each position of the modulation signal generator in the case where the signal is recording-position-modulated in the region which is discriminated as the character region. A period of the reference wave is the same as that of the original pixel.

In FIG. 26, (*a*) shows a portion of the signal in which the image density data read out according to the standard clock $DCK_0$ from the page memory 210 making the index signal a trigger, is converted into an analog value by the D/A converter 261. The higher the level is, the lower is the density shown, and the lower the level is, the darker is the density shown.

FIG. 26(*b*) shows the triangular wave which is the reference wave outputted successively from the triangular wave generators 250A to 250C.

FIG. 26(*c*) shows the triangular wave (continuous line), and the image density signal (one dotted chain line) which is converted into the analog value, and shows the modulation operations in the modulation circuits 260A to 260C.

FIG. 26(*d*) shows the pulse width modulation signal which is generated after the signal has been compared by the comparator 262, and shows that the recording position modulation, in which the recording position is shifted corresponding to the position of gravity center of density, has been conducted.

Due to the result of generation of the modulation signal, the recording position modulation is not conducted in the case of the pixel in the low density portion, or the high density portion, and in an region in which density change is large, the recording position modulation by which the position of small dots of n lines in the objective pixel is moved to the position along the original character and the line direction of the line image, is conducted according to the density data of the original adjoining pixel, so that the character and the line image can be reproduced sharply.

Figure 28:
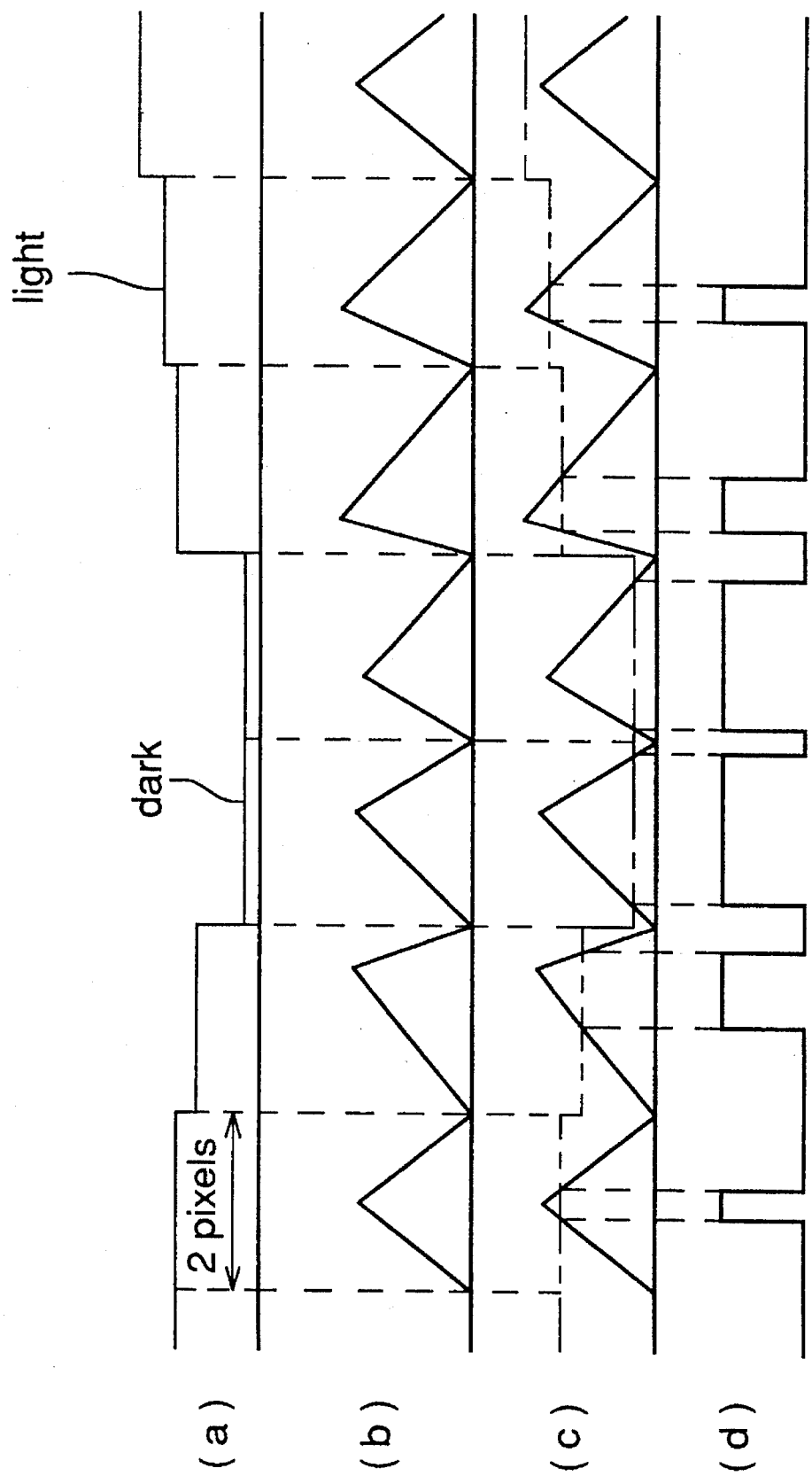
FIG. 28 is a time chart showing a signal of each portion of the modulation signal generating circuit of the example in FIG. 16 in the case where the image signal exists in the halftone region.

FIGS. 28 (*a*) to (*d*) are time charts showing the signal of each portion in the modulation signal generator in the case where the signal is recording-position-modulated in the region which is discriminated as the halftone region. As shown in FIG. 13, the period of the reference wave is twice the period of the original pixel.

In FIG. 28, (*a*) shows a portion of the signal in which the image density data read out from the page memory 210 according to the standard clock $DCK_0$ by making the index signal a trigger, is converted into an analog value by the D/A converter 261. The higher the level is, the lower is the density shown, and the lower the level is, the darker is the density shown. The image data has the image density in which data of two pixels are averaged in the primary scanning direction.

FIG. 28 (*b*) shows the triangular wave which is the reference wave outputted successively from the triangular wave generators 250A to 250C.

FIG. 28 (*c*) shows the triangular wave (continuous line), and the image density signal (one dotted chain line) which is converted into the analog value, and shows the modulation operations in the modulation circuits 260A to 260C.

FIG. 28 (*d*) shows the pulse width modulation signal which is generated after the signal has been compared by the comparator 262.

Due to the result of generation of the modulation signal, the recording position modulation is not conducted in the case of the pixel positioned in the low density portion, or the high density portion, and in a region in which density change is large, the recording position modulation by which the position of small dots of n lines in the objective pixel is moved to the position along the direction in which the density change is large, is conducted according to the density data of the original adjoining pixel, so that even halftones in photography or the like can be reproduced sharply.

Further, when a phase of the reference wave is shifted in the subsidiary scanning direction successively, a dot corresponding to a halftone dot having a screen angle can be structured. For example, when the screen angle is 45° for a yellow component, 26.6° for a magenta component, −26,6° for a cyan component, and 0° for a black component, uniformity of the color reproduction can be improved, and generation of Moire pattern can be eliminated.

In particular, it is a merit in this invention that when the screen angle for the black component is 0°, the recording position modulation means can be used without any alteration.

The raster scanning circuit 300 is provided with a δ delay circuit 311, a 2δ delay circuit 312, laser drivers 301A to 301C, an index detection circuit which is not shown in the drawings, and a polygonal mirror driver, and the like.

Laser drivers 301A to 301C oscillate a semiconductor laser array 431 having a plurality of (in this case, three) laser emission sections 431A to 431C by the modulation signal from the modulation circuits 260A to 260C, and a signal corresponding to an amount of light beams from the semiconductor laser array 431, is fed back, and the laser drivers 301A to 301C drive the semiconductor laser array 431 so that the light amount can be kept constant.

The index detection circuit detects the surface position of the rotating polygonal mirror 434 which is rotated at a predetermined speed by an index signal outputted from an index sensor 439 shown in FIG. 4, and conducts optical scanning by the image density signal modulated by the raster scanning method according to the period of the primary scanning direction. The scanning frequency is 2204.72 Hz, the effective printing width is not less than 297 mm, and the effective exposing width is not less than 306 mm.

The polygonal mirror driver rotates a D.C motor at a predetermined speed uniformly, and a rotary polygonal mirror 434 at 16535.4 rpm.

Figure 30:
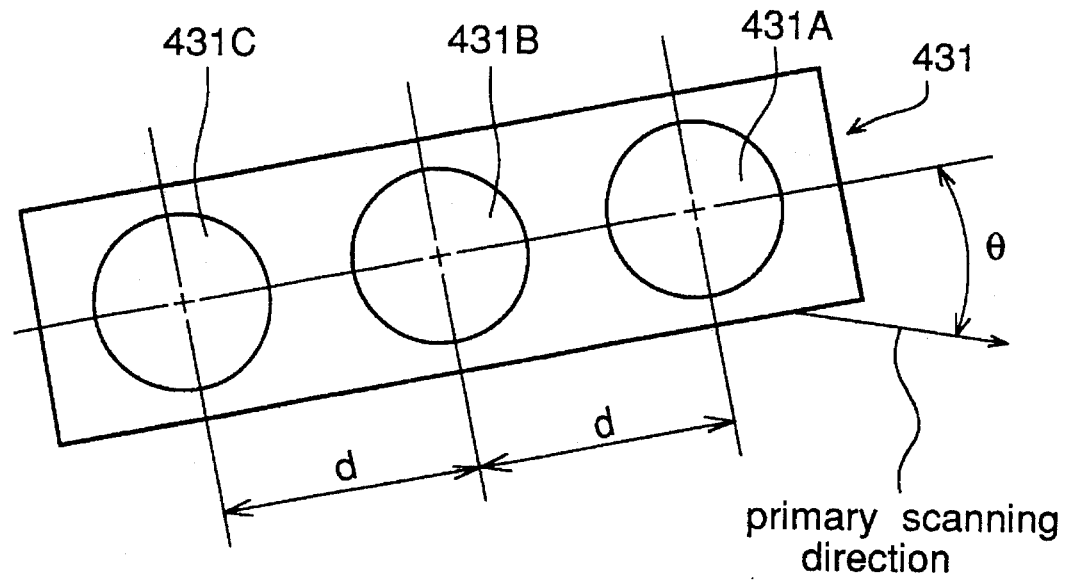
FIG. 30 is a view showing a semiconductor laser array of the example in FIG. 19.
Figure 31:
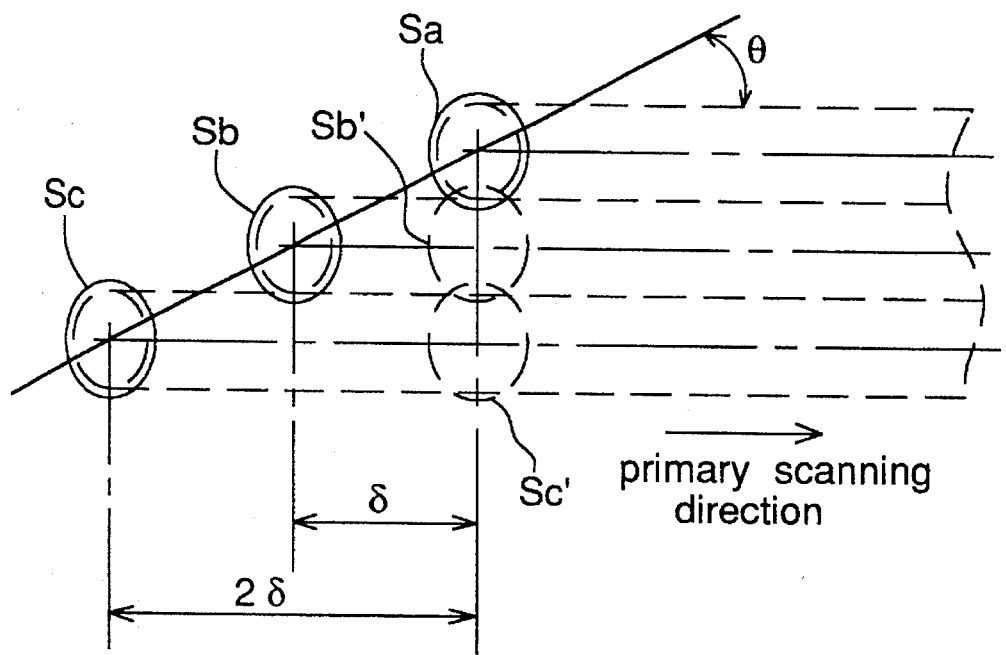
FIG. 31 is a view showing a scanning locus of laser spots using the semiconductor laser array in FIG. 27.

As shown in FIG. 30, the semiconductor laser array 431 is used in the manner that three emitting portions 431A to 431C are positioned in the array at same intervals. Since it is normally difficult that a space d between emitting portions is not more than 20 μm, a shaft which passes through the center of emitting portions 431A to 431C is mounted to be parallel with the rotating shaft of the rotary polygonal mirror 434, and to be inclined at a predetermined angle with respect to the primary scanning direction. Due to the aforementioned, laser spots sa, sb, sc of the laser beam by the semiconductor laser array 431 on the photoreceptor 401 can scan upwardly and downwardly in the manner that they are close to each other, as shown in FIG. 19. However, due to the aforementioned, positions of laser spots sa, sb, and sc in the scanning direction are deviated respectively with respect to the primary scanning direction. In order to correct the deviation, when the $\delta$ delay circuit 311 is inserted between the modulation circuit 260B and the laser driver 301B, and the $2\delta$ delay circuit 312 is inserted between the modulation circuit 260C and the laser driver 301C so that an appropriate amount of time is delayed and the timing is adjusted, laser spots sa, sb, and sc emitted from the semiconductor laser array 431 are replaced by sa, sb' and sc' which are vertically arranged with respect to the primary scanning direction so that sa, sb' and sc' can be recorded.

When the RE processing is conducted in the manner that the objective pixel is divided into 2×2 small pixels, the semiconductor laser array having two emitting portions is used.

Figure 35:
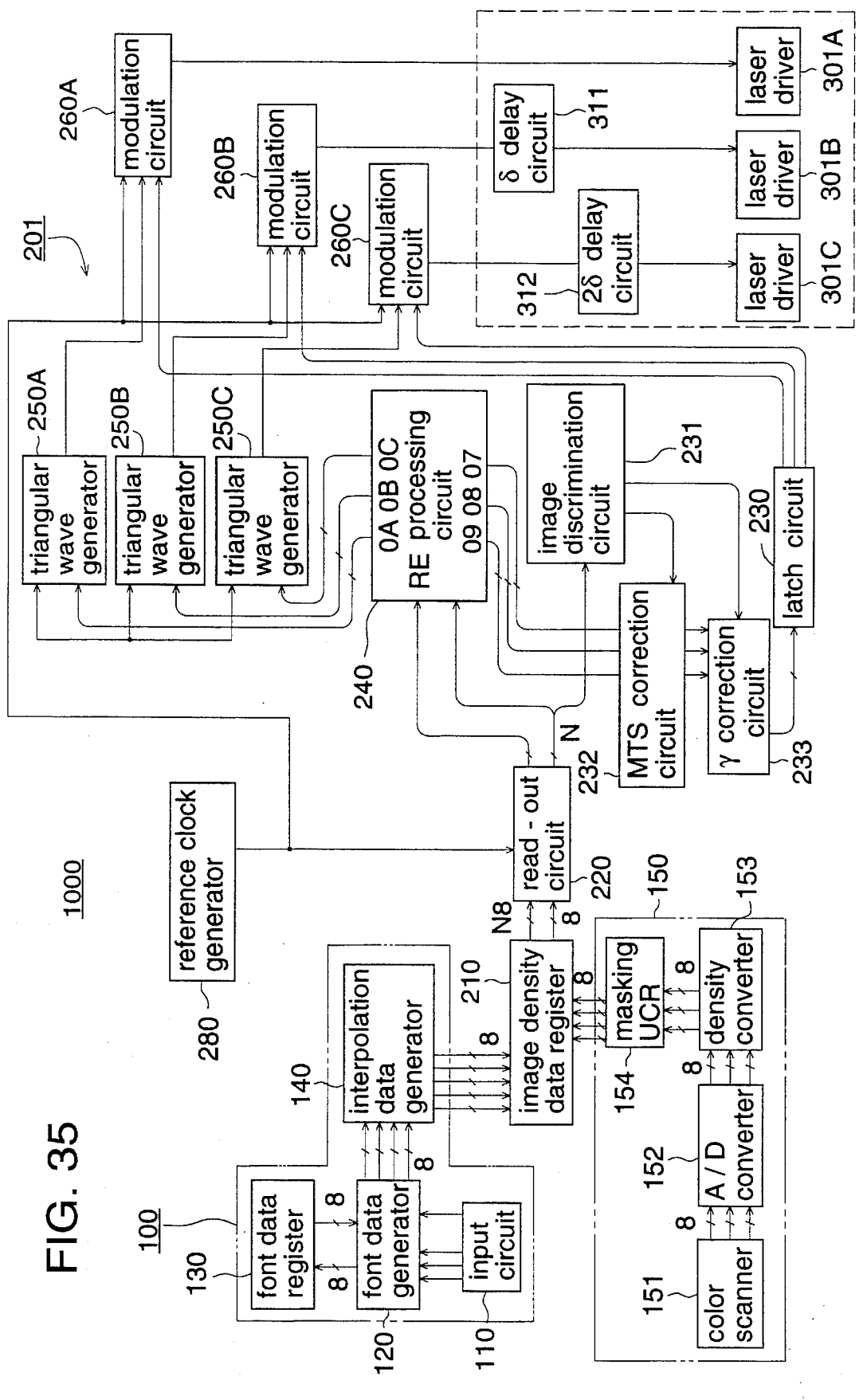
FIG. 35 is a block diagram showing an image processing circuit of another example of the present invention.
Figure 36:
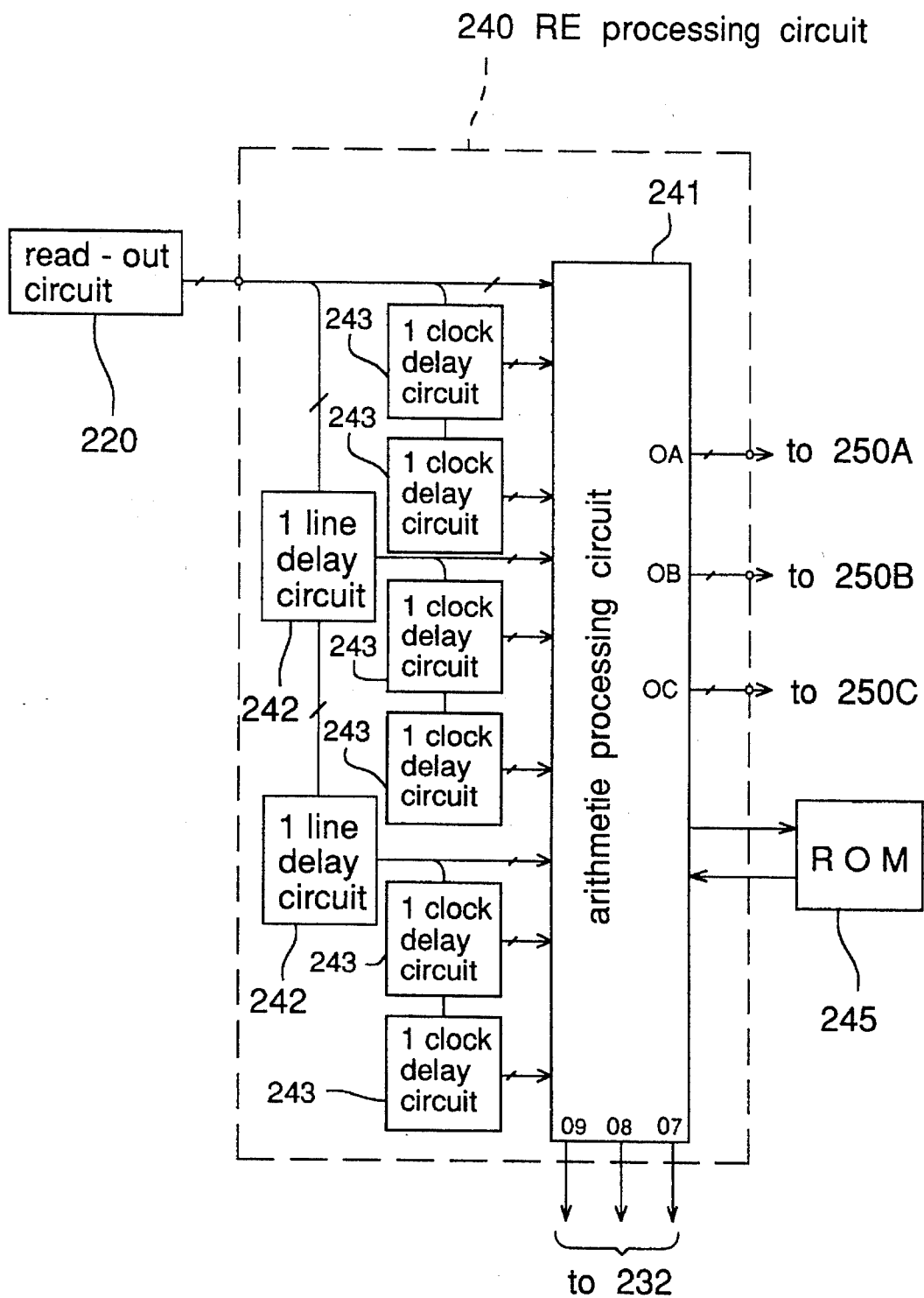
FIG. 36 is a block diagram showing an RE processing circuit in FIG. 35.

In the aforementioned embodiments of the present invention, as for the density information in each scanning direction, the average density in the primary scanning direction is regarded as the laser emitting output, and the data outputted from the read-out circuit 220 is used for the image data. However, the following structure can be adopted in which: the average density of each small scanning line obtained by the RE processing circuit 240, as shown in FIG. 35 and FIG. 36, is used for the density information; and the density data is inputted into the modulation circuits 260A to 260C by each reference wave so that laser drivers 301A to 301C are modulated.

Next, the image forming process of the image forming apparatus 400 shown in FIG. 4, will be explained as follows.

At first, the photoreceptor 401 is charged uniformly by the scorotron charger 402. An electrostatic latent image corresponding to yellow is formed on the drum-like photoreceptor 401 by the following method that: the laser beam modulated by yellow data (8 bit digital density data) read out from the image density data memory circuit 210 is focused through the cylindrical lens 433 and the rotating polygonal mirror 434, the fθ lens 435, the cylindrical lens 436, and the reflection mirror 437. The electrostatic latent image corresponding to yellow is developed by the first developing unit 441, and the extremely sharp dot-like first toner image (yellow toner image) is formed on the photoreceptor 401 surface. The first toner image is not transferred onto a recording sheet, passes under the cleaning device 470 which is withdrawn, and the scorotron charger 402 charges again the surface of the photoreceptor 401.

Next, the electrostatic latent image is formed as the laser beam modulated by magenta data (8 bit digital density data) is focused and scanned on the photoreceptor 401. The latent image is developed by the second developing unit 442 so that the second toner image (magenta toner image) is formed. In the same way as the above described, the electrostatic latent image by the cyan data is developed by the third developing unit 443 so that the third toner image (cyan toner image) is formed, and three color toner images, in which three images of different colors are superimposed successively, is formed on the photoreceptor 401. Lastly, the fourth toner image (black toner image) is formed, and four color toner image, in which four images of different colors are superimposed successively, is formed on the photoreceptor 401.

According to the image forming apparatus 400 of the present embodiment, the photoreceptor 401 has excellent high γ characteristics, and even when the toner image is formed in the manner that a plural number of times of charging and exposing processes are conducted repeatedly so that toner images are superimposed, the latent image can be formed stably due to the excellent high γ characteristics. That is, even when the laser beam is focused on toner images according to the digital signal, a dot-like electrostatic latent image which has high sharpness and no fringe, is formed, and thereby a toner image having high sharpness can be obtained.

These four color toner images are transferred onto a recording sheet fed from a sheet feed device by the transfer unit 462.

The recording sheet on which the transferred toner images are carried, is separated from the photoreceptor 401 by a separator 463, conveyed to a fixing roller 464 by a guide and a conveyance belt, thermally fixed and delivered to a sheet delivery tray.

In the present embodiment, as the result of experimenting in which values of factor P for RE processing were changed variously, a fine image could be obtained in the range of 0.1 to 0.9 of P. However, since sharpness of characters is insufficient when P is small, and an edge portion of a line image or a dot image is too emphasized when P is large, it was found that the preferable range of P is 0.3 to 0.7. Due to this, when an original document was written by line images or dots, the edge portion could be formed clearly, so that, even in the case of small characters, detail could be reproduced. Further, bad effects did not occur in the low density portion or high density portion. This is due to the reason that this method stops the recording position modulation with respect to these pixels, and makes the factor P=0.

Although, in this method, P can be used as a constant, it is preferable that P is changed in synchronization with the recording period, that is, corresponding to the image (in a character region or halftone region). When the P value is defined as $P_1$ in the case where the recording period is short, that is, the image is in the character region, and the P value is defined as $P_2$ in the case where the recording period is long, that is, the image is in the halftone region, the relation $$P_1 > P_2$$

is preferable. That is, when the image exists in the character region, the P value is set large, preferably 0.9 to 0.4, and when the image exists in the halftone region, the P value is set small, preferably 0.6 to 0.1.

P=0 corresponds to the value in the case where recording position modulation is not conducted.

Further, in the present invention, the ratio of the RE processing can be changed.

Figure 33:
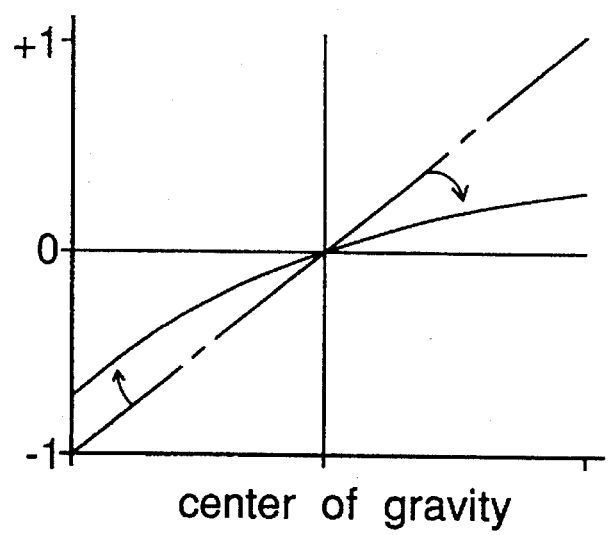
FIG. 33 is a graph showing an example in the case where the relation between the center of gravity in the primary scanning direction and a recording position of a small scanning line, is changed.
Figure 34:
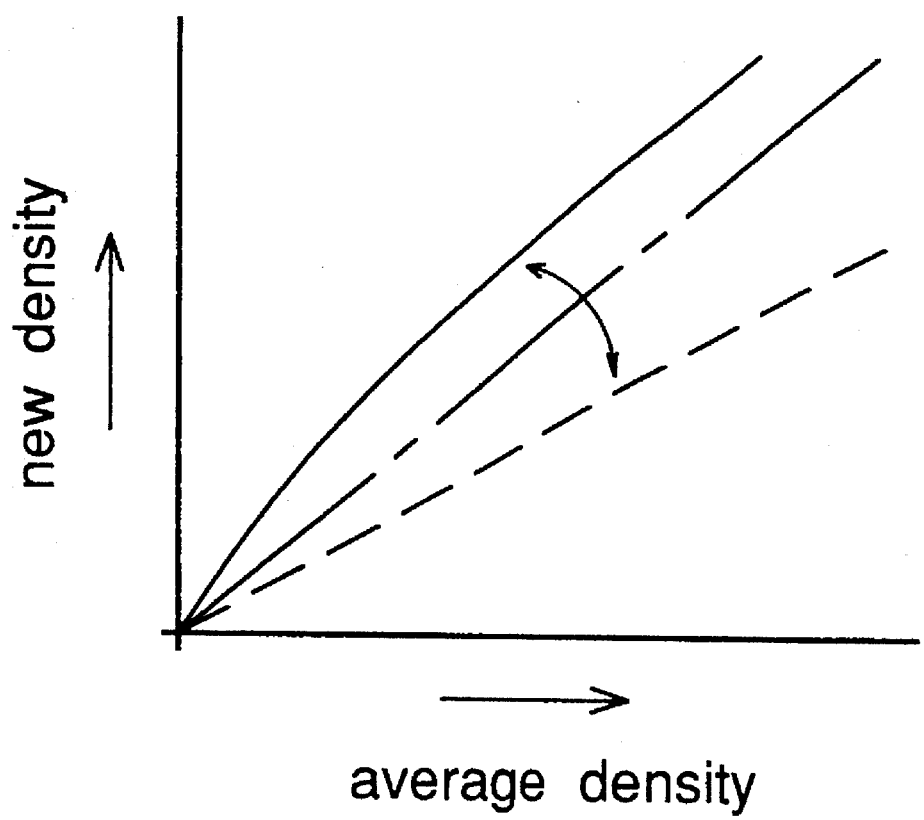
FIG. 34 is a graph showing the case where average density of the small scanning, line in the subsidiary direction is changed.

FIG. 33 is a graph showing an example of the case where the relation between the top position of the triangular wave corresponding to the recording position in the primary scanning direction and the gravity center is converted. FIG. 34 is a graph showing an example of the case where the average density in the subsidiary scanning direction is converted.

The recording position can be changed in the manner that the position data of gravity center is converted after being multiplied by the factor according to a conversion equation which is set beforehand, for example, as shown in FIG. 33 using a ROM 245 in which the result obtained from the image density data by arithmetic processing is contained. In the same way, the average density in subsidiary scanning direction can also be converted as shown in FIG. 34. "0" in FIG. 33 shows the central position of colors.

It is preferable to change the ratio of conversion shown in FIG. 33, and FIG. 34 corresponding to the case where the period of the reference wave is changed. When the period of the reference wave is large, it is preferable that gradation is seriously considered, and the ratio of the recording position modulation is decreased, or γ of gradation is decreased.

Further, in the present embodiment, though the pulse width is formed by comparing the selected reference wave with the density signal, the following structure can be adopted: a plurality of pulse widths are formed previously by comparing a plurality of reference waves with the density signal, and the pulse width corresponding to the specific reference wave may be selected from the recording position information.

In the present invention, a plurality of reference waves which have the same period and amplitude and different top positions are used. The advantages of the aforementioned are the following points: the pulse width formed by the comparison of the reference wave with the density information is the same; and the formed pulse width does not differ from other pulse widths. Due to this, the present invention has an advantage in that the image can be formed corresponding to the density information.

In the aforementioned flow of the image data, an example of a laser printer which outputs the data having been stored once in the page memory 210 is explained. However, the present invention is not limited to the specific embodiments, but when the image data processing circuit 100 is replaced by the image data processing circuit 150 composed of the color scanner 151, the A/D converter 152, the density converter 153, the masking UCR circuit 154 and the like, and the image density data is inputted into the processing circuit 150 from the scanner and the image is processed in the circuit, the present invention can be adopted to other image forming apparatus such as a copying apparatus and the like.

Further, although the period of the reference wave is changed at each pixel corresponding to the result of image discrimination, the entire image frame can be changed uniformly by an external command such as a character, photographic mode and the like.

This method is adopted to an device, like a light emitting panel EL, in which the pulse width can be modulated in the subsidiary scanning direction.

As explained above, the objective pixel is divided into small pixels with respect to the objective pixel included in the specific density corresponding to the density data of the objective pixel; concerning density of each small pixel, a means to generate the reference wave in which the top position of the triangular wave is deviated corresponding to the position of gravity center of density of the image data, on which the RE processing to distribute the density of the objective pixel corresponding to the distribution of the density data of the adjoining pixel including the objective pixel is conducted, is provided; and the recording position modulation signal, in which the density signal of the objective pixel is modulated by the reference wave generated by the means, is generated. Due to the aforementioned, since the reference wave does not overlap the other pixel, the other pixel is not affected, so that the recording image of high image quality can be obtained. Further, the area of the reference wave is not changed, so that the pulse width corresponding to the image density data can be formed without depending on the reference wave. Further, since color image recording is conducted by the following methods: the recording position modulation is not conducted with respect to the low density portion and high density portion; the image discrimination is conducted by the image discrimination circuit; when the image exists in the character region, the recording position modulation is conducted by the reference wave of a short period; and when the image exists in the halftone region, the recording position modulation is conducted by the reference wave of a long period, an excellent color image forming apparatus, in which sharpness can be increased without causing change in color tone of the color image which is generated from the scanner, CG, or font data, can be provided.

The aforementioned method shows the case where the number of recording beams for the pixel is three. Further, the following methods can be conducted: the pixel can be scanned by one or two recording beams; the recording position modulation can be conducted only in the primary scanning direction, or only in the subsidiary scanning direction; or the recording position modulation can be conducted on an EL head. When a high γ photoreceptor is used for the color image forming apparatus, effects can be further improved.

What is claimed is.

1. An apparatus for forming an electrostatic latent image dot for each pixel on a photoreceptor, wherein each pixel has an imaging unit area and the dot is formed in the imaging unit area, comprising:

beam generation means for generating a light beam to expose the photoreceptor and form a dot;

wave generation means for generating a reference triangular wave signal;

processing means for comparing an image signal of each pixel with the reference triangular wave signal to generate a modulating image signal;

means for modulating the light beam based on the modulating image signal to form a dot-shaped latent image corresponding to the image signal on the photoreceptor;

the processing means for processing image signals of pixels neighboring in a matrix arrangement around a target pixel to obtain a neighboring density distribution around the target pixel, dividing the imaging unit area of the target pixel into plural sub-pixels in the matrix arrangement wherein each sub-pixel is smaller in size than the target pixel, and obtaining a sub-density distribution of the sub-pixels in the target pixel based on the neighboring density distribution;

the processing means controlling the wave generation means so that the position of an apex of the reference triangular wave signal is changed in accordance with the sub-density distribution.

2. The apparatus of claim 1, wherein the sub-pixels are arranged in rows, the processing means controls the reference triangular wave signal for each of the rows of the sub-pixels, and the wave generation means changes the position of the apex of the reference triangular wave signal in accordance with the density distribution in each of the rows of the sub-pixels.

3. The apparatus of claim 2, wherein the processing means obtains a center of gravity in the density distribution and the wave generation means changes the position of the apex of the reference triangular wave signal in accordance with the position of the center of gravity.

4. An apparatus for forming a two-dimensional image with plural image lines of pixels comprising:

a photoreceptor on which a dot is formed for each pixel, wherein each pixel is provided with an imaging unit area and the dot is formed in the imaging unit area on the photoreceptor, and wherein the imaging unit area is divided into at least three dot forming positions including a center portion, a right portion and a left portion and the dot is selectively formed at one of the dot forming positions;

beam generating means for generating a light beam to expose the photoreceptor and form a dot;

processing means for processing image signals representing density levels of at least four neighboring pixels surrounding a target pixel, for obtaining a density distribution of the neighboring pixels surrounding the target pixel, for determining a dot forming position of the target pixel based on the density distribution of the neighboring pixels, and for outputting a position signal indicating the determined dot forming position of the target pixel, wherein the neighboring pixels comprise pixels on three image lines including a current image line having the target pixel, a preceding image line preceding the current image line and a succeeding image line succeeding the current image line;

wave generating means for generating at least three types of reference wave signals for each pixel, the three types of reference wave signals differing in wave form in accordance with the three dot forming positions, the wave generating means outputting one the three types of the reference wave signals corresponding to the determined dot forming position of the target pixel in response to the position signal outputted from the processing means, the processing means comparing an image signal representing a density level of the target pixel with the outputted reference wave signal to generate a modulating image signal; and means for modulating the light beam based on the modulating image signal to form a dot-shaped latent image in the imaging unit area on the photoreceptor, whereby the dot of the target pixel is formed at the determined dot forming position in the imaging unit area based on the density distribution of at least four neighboring pixels around the target pixel.

5. The apparatus of claim 4, further comprising clock means to generate a reference clock having a basic cycle period wherein a first type of the reference wave signals has a cycle period equal to the basic cycle period, a second type of the reference wave signals has a cycle period twice the basic cycle period, and a third type of the reference wave signals has a cycle period equal to the cycle period of the second type of the wave signals and differs in phase by 180° from the phase of the second type of the wave signals.

6. The apparatus of claim 5, wherein the reference wave signals are triangular wave signals.

7. The apparatus of claim 4, further comprising selection means for selecting one of the three types of reference signals in response to the position signal and outputting the selected reference wave signal.

8. The apparatus of claim 4, wherein said wave generating means outputs the three types of reference wave signals and the processing means compares the image signal of the target pixel with each of the three types of reference wave signals so that at least three types of modulating signals are provided for each pixel, and wherein the apparatus further comprises selection means for selecting one of the three types of modulating image signals in response to the position signal and outputting the selected modulating signal corresponding to the determined dot forming position.

9. The apparatus of claim 4, wherein the processing means divides the target pixel into plural sub-pixels formed in a matrix (n rows and m columns) in which each sub-pixel is smaller in size than the target pixel and obtains a sub-density distribution for sub-pixels based on the density distribution of the neighboring pixels, and wherein the dot forming position is determined for each row in accordance with a density distribution of sub-pixels in each row.

* * * * *